(12) United States Patent
Takayanagi et al.

(10) Patent No.: US 8,035,718 B2
(45) Date of Patent: Oct. 11, 2011

(54) SYSTEMS, METHODS, AND DEVICES FOR PREVENTING SHOOT-THROUGH CURRENT WITHIN AND BETWEEN SIGNAL LINE DRIVERS OF SEMICONDUCTOR DEVICES

(75) Inventors: Isao Takayanagi, Tokyo (JP); Mikael Kerttu, Santa Clara, CA (US); Per Olaf Pahr, Lier (NO)

(73) Assignee: Aptina Imaging Corporation, George Town (KY)

( * ) Notice: Subject to any disclaimer, the term of this patent is extended or adjusted under 35 U.S.C. 154(b) by 731 days.

(21) Appl. No.: 12/056,185

(22) Filed: Mar. 26, 2008

(65) Prior Publication Data

US 2009/0244344 A1    Oct. 1, 2009

(51) Int. Cl.
*H04N 5/217* (2006.01)
*H04N 3/14* (2006.01)
*H04N 5/335* (2006.01)
*H01L 27/00* (2006.01)

(52) U.S. Cl. ........ 348/312; 348/241; 348/296; 348/302; 250/208.1

(58) Field of Classification Search .................. 348/241, 348/294, 296, 302, 312; 250/208.1
See application file for complete search history.

(56) References Cited

U.S. PATENT DOCUMENTS

| | | | |
|---|---|---|---|
| 4,603,355 A * | 7/1986 | Yamada et al. | 348/305 |
| 4,701,865 A | 10/1987 | Goodman | |
| 5,329,288 A | 7/1994 | Kim | |
| 5,777,314 A | 7/1998 | Roustaei | |
| 6,023,434 A | 2/2000 | Shore et al. | |
| 6,088,058 A * | 7/2000 | Mead et al. | 348/296 |
| 6,795,117 B2 | 9/2004 | Tay | |
| 6,920,078 B2 | 7/2005 | Cho | |
| 7,034,781 B2 | 4/2006 | Irmer et al. | |
| 7,224,390 B2 * | 5/2007 | Kokubun et al. | 348/308 |
| 7,250,970 B2 * | 7/2007 | Shinohara | 348/308 |
| 2002/0109160 A1 * | 8/2002 | Mabuchi et al. | 257/233 |
| 2003/0012053 A1 | 1/2003 | Chevallier | |
| 2003/0193594 A1 | 10/2003 | Tay | |
| 2005/0281102 A1 | 12/2005 | Bruland | |
| 2006/0113461 A1 * | 6/2006 | Barna | 250/208.1 |

OTHER PUBLICATIONS

Bales, T. et al., "An 8.9 Mega-Pixel, 60 fps CMOS Image Sensor with 14bit Column Parallel ADC," IEEE Internatl. Solid-State Circuits Conference 2008 Paper Proposal.
Nomoto, T. et al., "A 2/3-inch 2M-Pixel CMD Image Sensor with Multi-Scnaning Function," IEEE Internatl. Solid-State Circuits Conference, 1993.

* cited by examiner

*Primary Examiner* — Daniel M Pasiewicz
(74) *Attorney, Agent, or Firm* — Jason Tsai

(57) ABSTRACT

An imaging device driver for transmitting a signal onto a signal line for controlling transistors of a pixel row. The device includes a controller and associated circuitry for reducing shoot-through current within and between row driver circuits for driving the signal line. The controller reduces shoot-through current by preventing concurrent transmission of high and low signal outputs to the signal line by respective high and low voltage sources of the same or different row driver circuits.

13 Claims, 18 Drawing Sheets

BACKGROUND

BACKGROUND

BACKGROUND

BACKGROUND

SYSTEMS, METHODS, AND DEVICES FOR PREVENTING SHOOT-THROUGH CURRENT WITHIN AND BETWEEN SIGNAL LINE DRIVERS OF SEMICONDUCTOR DEVICES

TECHNICAL FIELD

Embodiments of the invention relate to signal line drivers for semiconductor devices, and more particularly to signal line drivers which may be used in imaging devices.

BACKGROUND OF THE DISCLOSURE

As explained with reference to FIGS. 1-3C, signal line drivers are susceptible to unwanted transmissions of shoot-through current. The problem occurs in, among other circuits, CMOS imaging devices, because resulting current spikes can produce noise within captured images. Accordingly, the embodiments of the invention are disclosed with reference to, but are not limited to, use in a CMOS imaging device.

FIG. 1 is a circuit diagram illustrating a non-limiting example of a conventional four transistor pixel cell 150, which may be used in a CMOS imaging device. During an integration period, light strikes the photosensor 101 and generates charges stored in an accumulation region of the photosensor. After the integration period and in response to a charge transfer signal TX, a charge transfer transistor 106 gates the photogenerated charges from the accumulation region to a storage node 102, which may be constructed as a floating diffusion region. The transferred charges bias the gate of a source follower transistor 108, which has a first terminal connected to a voltage source VDD and a second terminal that consequently transmits an image signal Vsig indicating the amount of charge stored in the storage node 102. In response to a row select signal ROW, a row select transistor 109 gates the image signal Vsig to a column line 160 for subsequent sampling and processing. The pixel cell actually generates two output voltage signals, one is a reset signal Vrst, which is produced by transistor 108 when the storage node 102 is reset to a predetermined charge level by an "on" state of reset transistor 107, and the other is the image signal Vsig.

FIG. 2 is a block diagram illustrating a non-limiting example of a conventional CMOS imaging device 200 for reading out a captured image, as digital data, to an image processor 280. The imaging device 200 includes a pixel array 260 having a plurality of pixel cells 150 arranged in rows and columns, and row 170 and column 120 drivers for accessing the pixel cells to control their operation during signal readout. In CMOS images with larger pixel arrays, the pixel rows may be accessed by devices provided to drive control signal lines on both the left and right sides of the array, as shown in FIG. 2. Thus, in response to row address signals ADD (not shown) from left and right row address decoders 110L, 110R (hereinafter also collectively referred to as row address decoders 110), respective left and right row drivers 170L, 170R (hereinafter also collectively referred to as row drivers 170) selectively transmit charge transfer TX, reset RST, and row select ROW signals to the charge transfer 106, reset 107, and row select 109 transistors of the pixel cell 150 of an addressed pixel row. The transistors 106-109 within the each pixel row are thereby controlled to generate the output signals Vrst, Vsig of the pixel cells 150 within the addressed pixel row, and to provide the output signals to respective column lines 160 connected to the pixel cells 150. In response to a column address signal COL (not shown) from a column address decoder 270, a column driver 120 gates each of the output signals Vrst, Vsig from their respective column lines 160 to a sample and hold (S/H) circuit 265, which samples and holds the Vrst, Vsig signals. A timing and control circuit 250 controls the row and column address decoders 110, 270 to coordinate the generation and readout of the output signals by the pixel cells 150.

At respective times, the reset Vrst and image Vsig signals of the pixel cell 150 are provided by the row select transistor 109 to the respective column line 160, and then provided by the column driver 120 to respective capacitors of the S/H circuit 265. The held reset Vrst and image Vsig signals are converted to a differential signal (Vrst−Vsig) by a differential amplifier 267. The differential signal (Vrst−Vsig) is converted to digital data by an analog-to-digital converter (ADC) 275, and the digital data is provided to the image processor 280 for processing with the digital data of other pixel cells 150 of the pixel array 200.

FIG. 3A is a block diagram illustrating a non-limiting example of a dual row driver architecture 300, which may be employed by the imaging device 200 of FIG. 2. For convenience, only two pixel rows and two pixel cells 150 (of each row) are illustrated. As shown, the left and right row drivers 170L, 170R collectively provide three pairs of row driver buffers to each pixel row: left and right reset signal buffers 340L(RST), 340R(RST) for driving a shared reset signal line 130(RST); left and right row select signal buffers 340L(ROW), 340R(ROW) for driving a shared row select signal line 130(ROW); and left and right charge transfer signal buffers 340L(TX), 340R(TX) for driving a shared charge transfer signal line 130(TX) (hereinafter also collectively referred to as buffers 340(RST), 340(ROW), 340(TX), 340L, 340R, and 340). Each set of left and right buffers 340L, 340R drives either the reset 107, row select 109, or charge transfer 106 transistors of a pixel row by selectively transmitting "high" and "low" signal outputs to a respective signal line 130; e.g., the left and right reset signal buffers 340L(RST), 340R(RST) control the reset transistors 107 of the illustrated pixel row by concurrently transmitting a high or low signal output to the reset signal line 130(RST).

By using left and right buffers 340L, 340R to drive opposing ends of a shared signal line 130, the dual row driver architecture 300 reduces signal propagation delay. In a single row driver architecture having only one signal line driver per signal line 130, a transmitted signal has a maximum propagation delay $T_{max}$ of approximately:

$$T\text{max} = \tfrac{1}{2}RC \qquad (1)$$

where R and C are the total resistance and capacitance, respectively, of the signal line 130 from the start point to the end point of transmission. In the dual row driver architecture 300, a signal has a maximum propagation delay $T_{max}$ of approximately:

$$T\text{max} = \tfrac{1}{8}RC \qquad (2)$$

because the total resistance R and total capacitance C are each reduced by about one-half.

The dual row driver architecture 300 is susceptible to "inter" shoot-through current when the left and right buffers 340L, 340R are not operated in perfect synchronism and thus transmit different signal outputs at the same time. Even if the buffers 340L, 340R are designed to simultaneously switch between their high and low signal outputs, that may not always be the case. When one of the opposing buffers 340L, 340R lags behind the other in switching from a high to a low signal output, or vice-versa, inter shoot-through current can short across the signal line 130 from the high voltage source (e.g., a VDD output terminal) of the buffer 340 driving the signal line 130 high to the low voltage source (e.g., a VSS or GND output terminal) of the buffer 340 concurrently driving the signal line 130 low.

Each of the buffers 340L, 340R is also susceptible to "intra" shoot-through current. Intra shoot-through current occurs when an individual buffer 340 transmits both a high and low signal output to the signal line 130 at the same time. As will be further explained below, each of the buffers 340 selectively drives the signal line "high" and "low" by gating a high voltage signal from a high voltage source (e.g., a VDD output terminal) to the signal line 130; and by gating a low voltage signal from a low voltage source (e.g., a VSS or GND) to the signal line 130. If a buffer 340 concurrently provides the high and low voltage sources access to the signal line 130 (or to a common output node), the high and low voltage sources are temporarily connected and intra shoot-through current can transmit between them within the buffer 340. Because intra shoot-through current occurs within a single buffer 340, it can occur in single and dual row driver architectures alike.

DETAILED DESCRIPTION OF THE DRAWINGS

Figure 1:
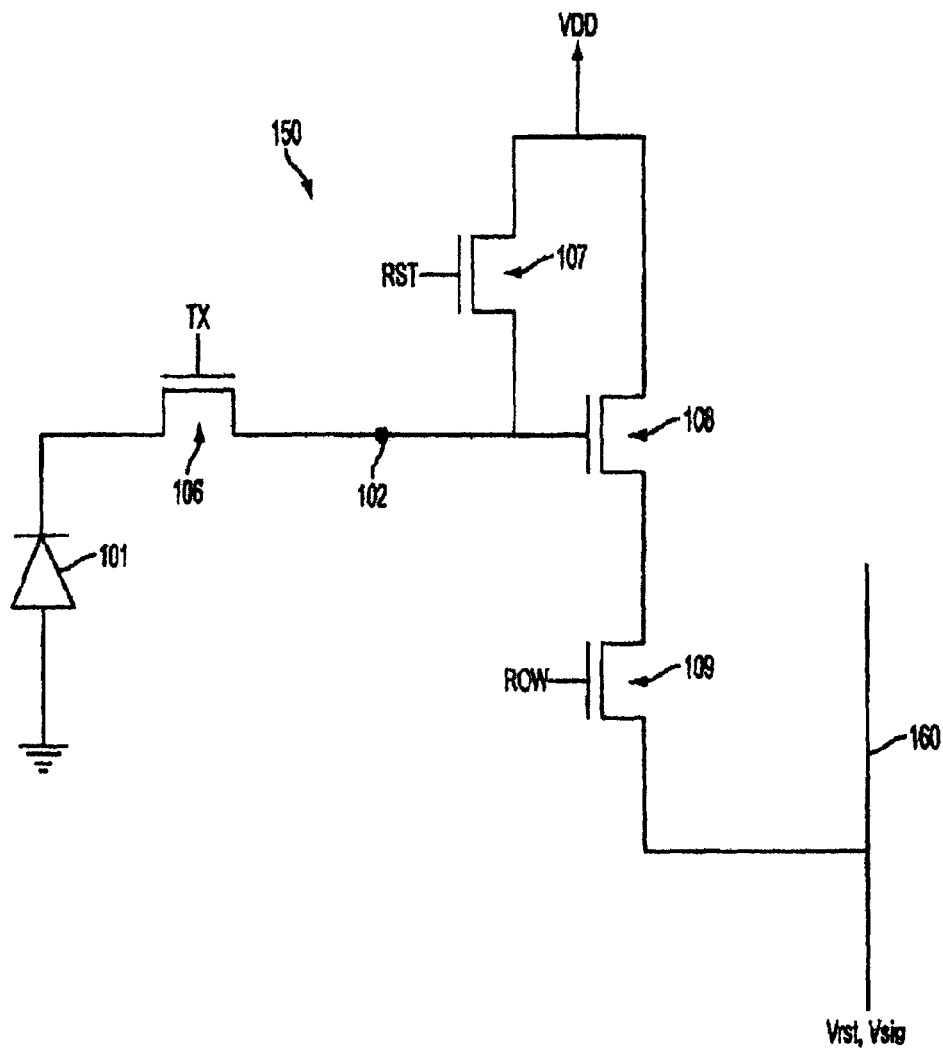
FIG. 1 is a circuit diagram illustrating a conventional pixel cell.

Reference is made to the accompanying drawings, which form a part of this disclosure and in which like reference characters are provided for like elements. Structural, logical, and electrical changes may be made without departing from the spirit and scope of the disclosed embodiments.

A method and apparatus which mitigates against possible "inter" and "intra" shoot through currents would be desirable. Embodiments described herein seek to mitigate against "inter" and "intra" shoot through current in a dual buffer line driver. Before discussing these embodiments, the "inter" and "intra" shoot through currents are explained with reference to FIGS. 3B and 3C.

Figure 3A:
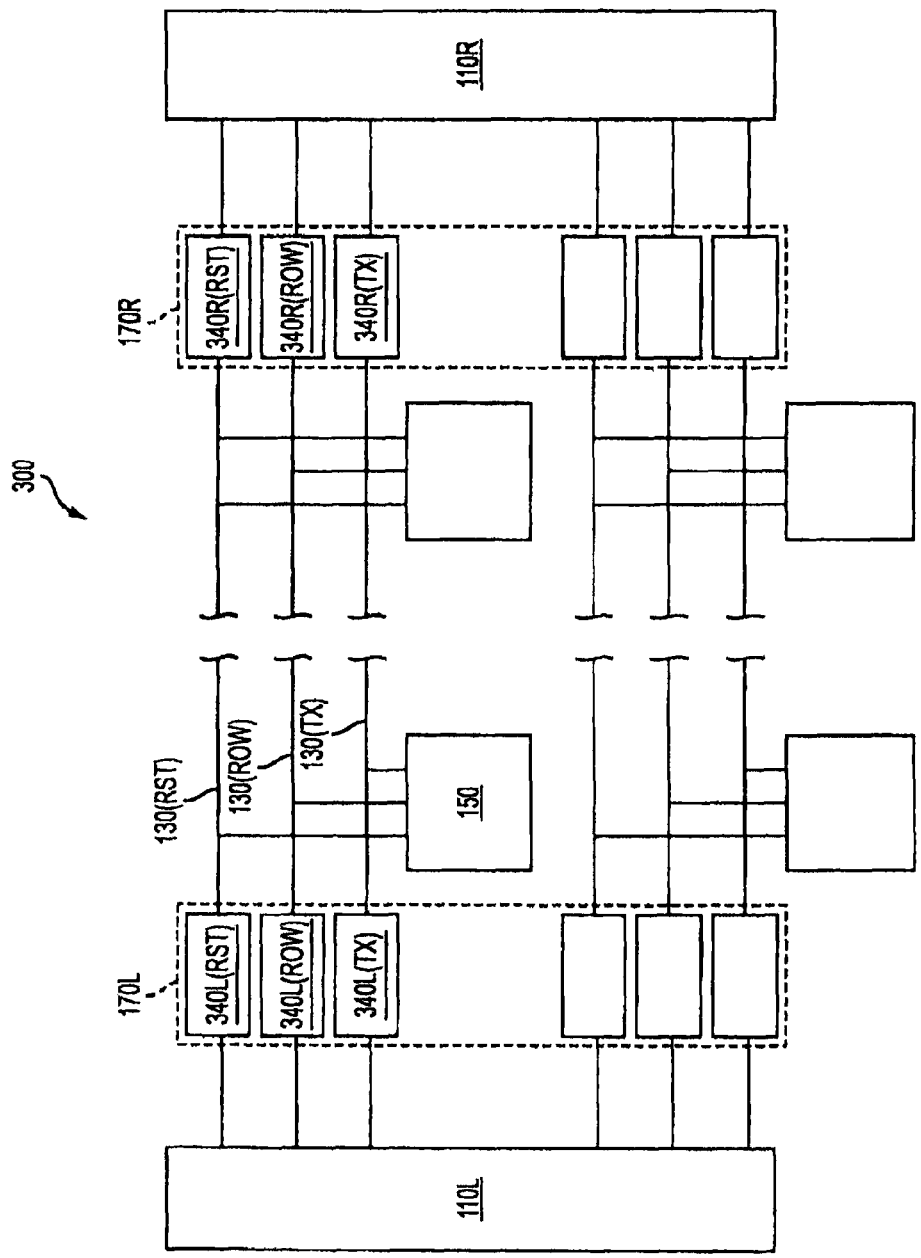
FIG. 3A is a block diagram illustrating a conventional dual row driver architecture without shoot-through current protection.
Figure 3B:
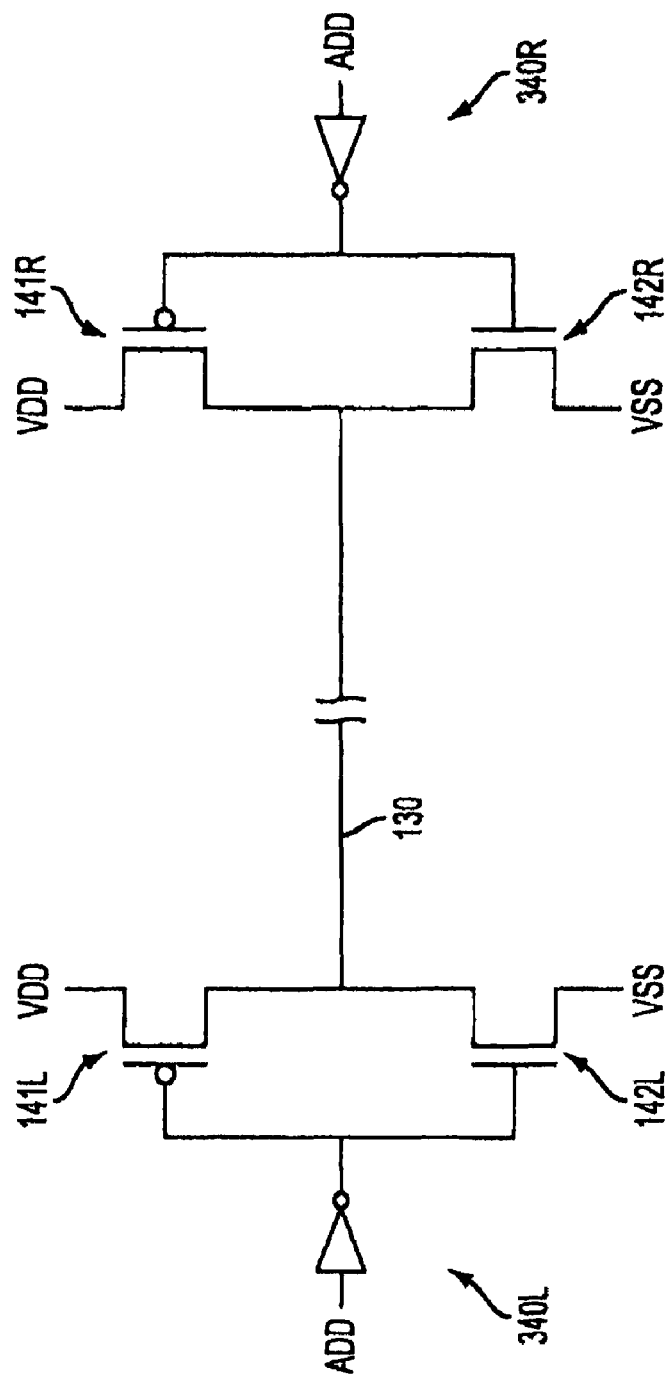
FIG. 3B is a circuit diagram for illustrating examples of inter and intra shoot-through current within the dual row driver architecture of FIG. 3A.

FIG. 3B is a circuit diagram for illustrating non-limiting examples of the buffers 340L, 340R which may produce inter and intra shoot current in the dual row driver architecture 300 of FIG. 3A. For convenience, portions of the dual row driver architecture 300 are omitted. As shown, the left and right buffers 340L, 340R respectively include left and right high output transistors 141L, 141R and left and right low output transistors 142L, 142R (hereinafter also collectively referred to as high 141 and low 142 output transistors). Each of the high output transistors 141 gates a high voltage signal from a high voltage source VDD to the signal line 130. Each of the low output transistors 142 gates a low voltage signal from a low voltage source VSS to the signal line 130. The high 141 and low 142 output transistors have first terminals respectively connected to the high VDD and low VSS voltage sources, second terminals commonly connected to the signal line 130, and gate terminals which receive an inverted row address signal ADD from the row address decoders 170.

The high 141 and low 142 output transistors are of different conductivity types, respectively PMOS and NMOS. In each of the buffers 340L, 340R, a high row address signal ADD is inverted and then used to switch the high 141 and low 142 output transistors on and off, respectively, and to thereby short only the high voltage source VDD to the signal line 130. A low address signal ADD is inverted and then used to switch the high 141 and low 142 output transistors off and on, respectively, and to thereby short only the low voltage source VSS to the signal line 130. By using their address signals ADD to control the high 141 and low 142 output transistors, the row address decoders 170 can in turn control transmission of high and low voltage signals by the buffers 340 to the signal line 130.

When transitioning from low to high signal outputs, or vice-versa, if the left and right buffers 340L, 340R switch to high (or low) signal outputs at different times (e.g., if the high row address signals ADD are received by the buffers 340L, 340R at different times), inter shoot-through current may short across the signal line 130 from the high voltage source VDD 340 to the low voltage source VSS. In addition, within a single buffer 340, if the high output transistor 141 is switched on before the low output transistor 142 is switched off, both of the output transistors 141, 142 will be temporarily switched on in the buffer 340 and intra shoot-through current may therefore short between the high VDD and low VSS voltage sources of the buffer 340.

Figure 3C:
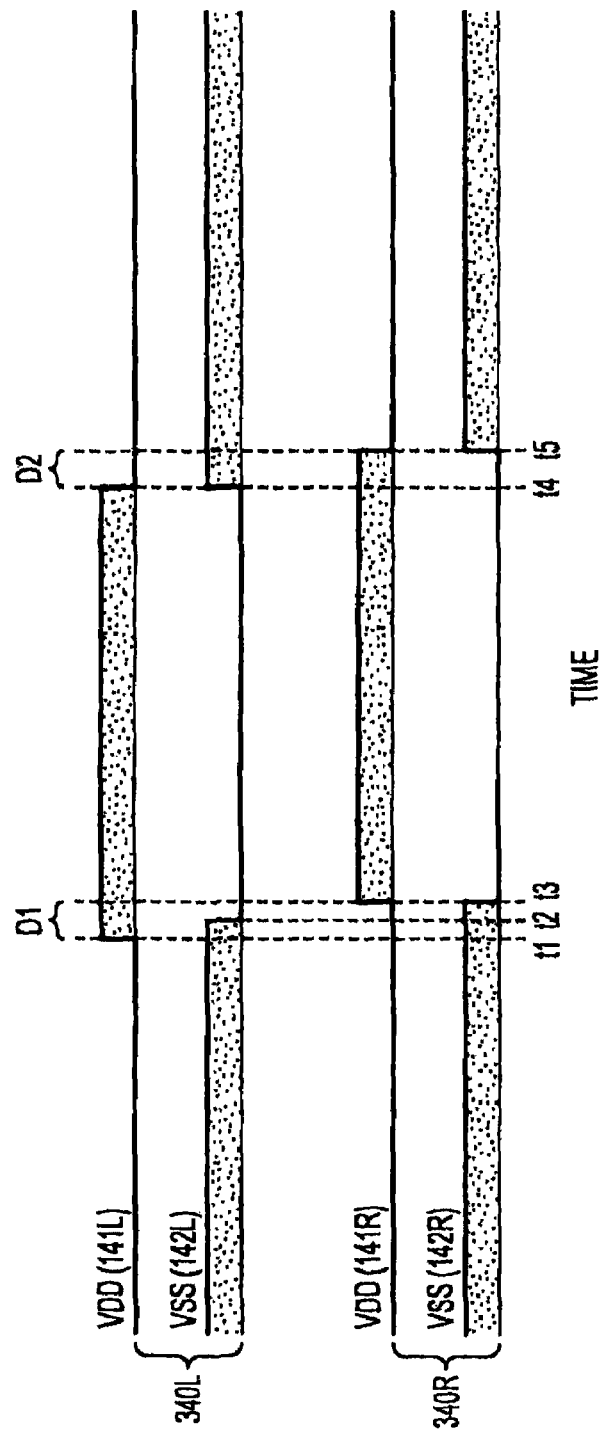
FIG. 3C is a timing diagram for illustrating examples of inter and intra shoot-through current within the dual row driver architecture of FIG. 3A.

FIG. 3C is a timing diagram illustrating some examples of inter- and intra-shoot through current in the dual row driver architecture 300 of FIG. 3A. For each of the buffers 340L, 340R, the high VDD and low VSS signal outputs respectively coincide with activation of the high 141 and low 142 output transistors. As shown, there is a first lag period D1 between the times t1 and t3 at which the buffers 340L, 340R respectively switch to high VDD signal outputs; and a second lag period D2 between the times t4 and t5 at which the buffers 340L, 340R respectively switch to low VSS signal outputs. During the first lag period D1, inter shoot-through current shorts across the signal line 130 from the high voltage source VDD of the left buffer 340L to the low voltage source VSS of the right buffer 340R. During the second lag period D2, inter shoot-through current shorts across the signal line 130 from the high voltage source VDD of the right buffer 340R to the low voltage source VSS of the left buffer 340L.

In addition, intra shoot-through current occurs within the left buffer 340L. At time t1, the upper transistor 141L of the left buffer 340L switches on to gate a high voltage signal from the high voltage source VDD to the signal line 130. The lower transistor 142L of the left buffer 340L switches off slightly thereafter at time t2. Between the times t1 and t2, there is a period during which the left buffer 340L drives the signal line 130 with both high VDD and low VSS signal outputs, and intra shoot-through current consequently shorts between the high VDD and low VSS voltage sources.

Figure 4A:
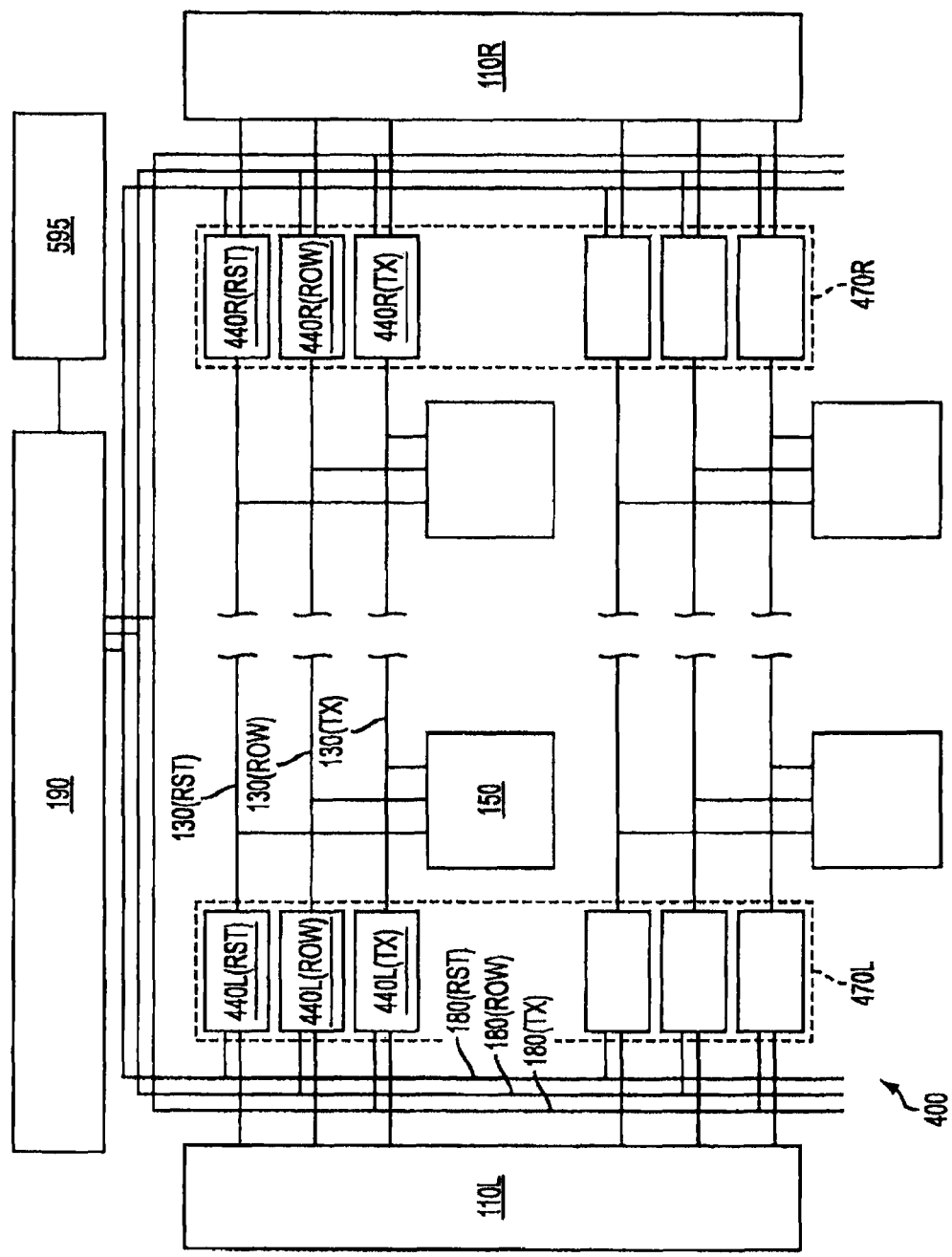
FIG. 4A is a block diagram illustrating a dual row driver architecture with inter shoot-through current protection.

FIG. 4A is a block diagram illustrating a non-limiting first inventive embodiment of a dual row driver architecture 400 with inter shoot-through current protection. For convenience, only two pixel rows and two pixel cells 150 (of each row) are illustrated. Similar to the dual row driver architecture 300 of FIG. 3A, left and right row drivers 470L, 470R of the dual row driver architecture 400 respectively provide left and right reset signal buffers 440L(RST), 440R(RST) for driving a shared reset signal line 130(RST), left and right row select signal buffers 440L(ROW), 440R(ROW) for driving a shared row select signal line 130(ROW), and left and right charge transfer signal buffers 440L(TX), 440R(TX) for driving a shared charge transfer signal line 130(TX) (hereinafter also collectively referred to as buffers 440(RST), 440(ROW), 440(TX), 440L, 440R, and 440). The left 110L and right 110R row address decoders transmit row address signals ADD (FIG. 4B) to their respective left 470L and 470R row drivers.

Unlike the dual row driver architecture 300 of FIG. 3A, dual row driver architecture 400 includes a global controller 190 for transmitting global control signals CON_G (FIG. 4B) to reset 180(RST), row select 180(ROW), and charge transfer 180(TX) global control lines (hereinafter collectively referred to as control lines 180) respectively associated with multiple pairs of the reset buffers 440(RST), row select buffers 440(ROW), and charge transfer buffers 440(TX). As will be further described below, the global controller 190 transmits the control signals CON_G to selectively prevent the buffers 440 from transmitting signal outputs to the signal line 130 during lag periods (e.g., the lag periods D1, D2 of FIG. 3C). The dual row driver architecture 400 also includes a timing information unit 595, which provides the global controller 190 with information for timing transmission of the control signals CON_G. The timing information unit 595 is described after the following description of FIGS. 4B and 4C.

Figure 4B:
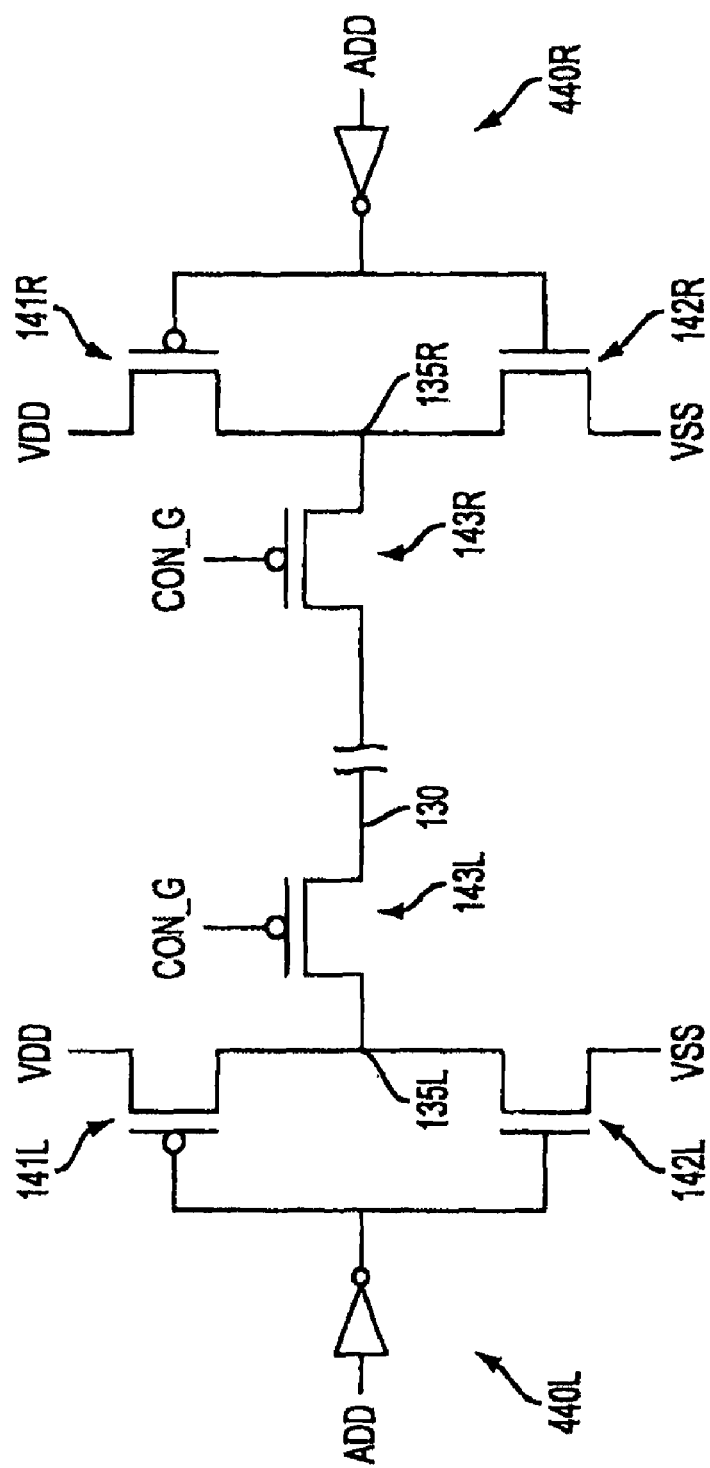
FIG. 4B is a circuit diagram for illustrating examples of inter shoot-through current protection within the dual row driver architecture of FIG. 4A.

FIG. 4B is a circuit diagram illustrating a non-limiting example of an inter shoot-through current protection in the dual row driver architecture 400 of FIG. 4A. As can be seen, the circuit diagrams of FIGS. 3B and 4B are identical, with the exception that the signal outputs of the left and right buffers 440L, 440R of FIG. 4B are respectively controlled by isolation devices shown as left and right protection transistors 143L, 143R. The term "isolation device" is intended to include not only transistors, such as for example the left and right protection transistors 143L, 143R, but also to more broadly include devices which selectively control a movement of charge from one region to another. The left 141L, 142L and right 141R, 142R transistors are respectively connected to left and right output nodes 135L, 135R (hereinafter also collectively referred to as output nodes 135), which in turn are respectively separated from the signal line 130 by left and right protection transistors 143L, 143R (which may be generally referred to as protection transistors 143). Therefore, in each of the buffers 440L, 440R, the high output transistor 141 gates a high voltage signal from the high voltage source VDD to the node 140 when its respective buffer 440 receives a high address signal ADD; and the low output transistor 142 gates a low voltage signal from the low voltage source VDD to the node 140 when its respective buffer 440 receives a low address signal ADD.

The protection transistors 143 control transmission of the high and low signal outputs from the nodes 140 to the signal line 130. More particularly, when switched on by a low control signal CON_G, the PMOS protection transistors 143 allow transmission between their respective buffers 440 and the signal line 130. When switched off by a high control signal CON_G, the protection transistors 143 isolate their respective buffers 440 from the signal line 130 to block transmission therebetween. Each protection transistor 143 can therefore prevent inter shoot-through current by blocking transmission of a high signal output from the signal line 130 to the low voltage source VSS of its respective buffer 440. Each protection transistor 143 can also prevent inter shoot-through current by blocking transmission of a high signal output from its respective buffer 440 to the signal line 130, which in turn prevents transmission of the high signal output across the signal line 130 to the low voltage source VSS of another buffer 440.

Figure 4C:
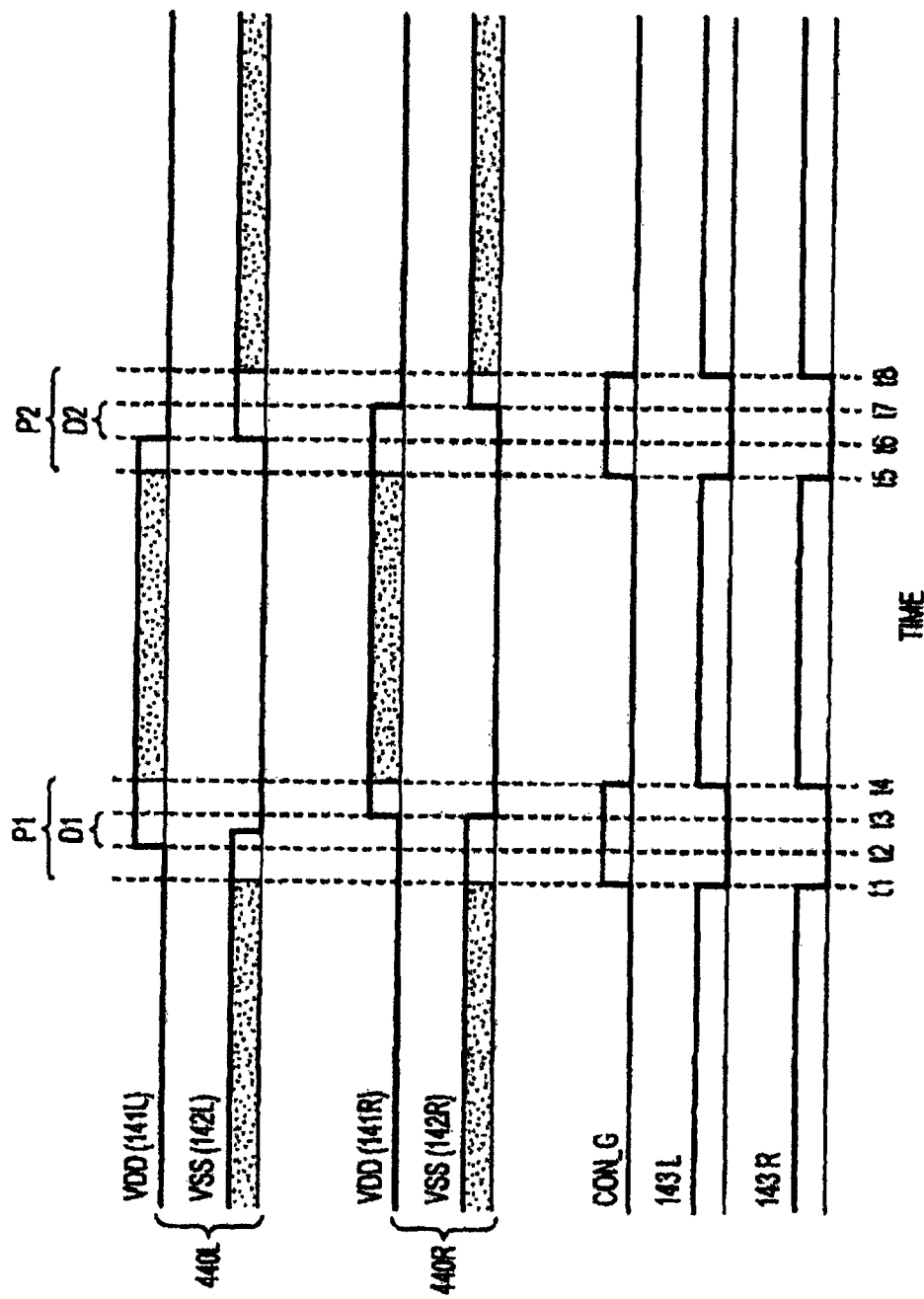
FIG. 4C is a timing diagram for illustrating examples of inter shoot-through current protection within the dual row driver architecture of FIG. 4A.

FIG. 4C is a timing diagram for further illustrating non-limiting examples of the operation of the FIG. 4B circuit. In this timing diagram, the stippled gray regions represent the times at which high and low signal outputs are respectively transmitted from the high VDD and low VSS voltage sources of the buffers 440 to the signal line 130. The pulse signals, which include those stippled regions, represent the times at which the high 141 and low 142 output transistors of the buffers 440 are switched on. For example, the left high output transistor 141L switches on at time t2, but a high signal output is not transmitted from the left buffer 440L to the signal line 130 until time t4.

As shown, there is a first lag period D1 between the times t2 and t3 at which the left and right buffers 440L, 440R respectively switch on their high output transistors 141L, 141R. There is also a second lag period D2 between the times t6 and t7 at which the left and right buffers 440L, 440R respectively switch on their low output transistors 142L, 142R.

As shown in FIG. 4C, the protection transistors 143L, 143R respectively prevent the left and right buffers 440L, 440R from transmitting different signal outputs during these lag periods D1, D2. More particularly, for the durations of a first protection period P1 from time t1 to t4 and a second protection period P2 from time t5 to t8, which respectively envelop the lag periods D1, D2, a high control signal CON_G is output by the global controller 190 to switch off the protection transistors 143L, 143R and prevent transmission between their respective buffers 440L, 440R and the signal line 130. The protection periods P1, P2 (hereinafter also collectively referred to as protection periods P) thereby provide a lagging buffer 440 time to "catch-up" to the earlier switching buffer 440.

Though the dual row driver architecture 400 illustrated by FIGS. 4B and 4C employs multiple protection transistors 143 on the signal line 130, inter shoot-through current can be prevented by any device configured to selectively gate transmission between the high VDD and low VSS voltage sources of the buffers 440. For example, if the left buffer 440L is always the first to switch from a low to high signal output and the last to switch from a high to low signal output (e.g., by design), then inter shoot-through current can be blocked by a single transistor arranged anywhere in series between the high voltage source VDD of the left buffer 440L and the low voltage sources VSS of right 440R buffer.

Though inter shoot through current can be prevented by arranging a single protection transistor 143 along the signal line 130, providing left and right protection transistors 143L, 143R respectively between the left and right buffers 440L, 440R and the signal line 130 can additionally prevent the occurrence of only one buffer 440 driving a portion of the signal line 130. For example, because the protection transistors 143L, 143R prevent any transmission of signal outputs to the signal line 130 during the lag periods D1, D2, the protection transistors 143L, 143R prevent transmission of a high signal output VDD to the signal line 130 by only the left buffer 440L during lag period D1, and prevent transmission of a high signal output VDD to the signal line 130 by only the right buffer 440R during lag period D2. Accordingly, as the signal line 130 is driven by neither or both buffers 440L, 440R (i.e., not by one buffer 440), a more consistent signal is provided to the signal line 130.

As noted above, the dual row driver architecture of FIG. 4A includes a timing information unit 595, which provides the global controller 190 with information for timing the output of the control signals CON_G. The timing information may indicate the appropriate start times, durations, and end times of the protection periods P1, P2. For example, the timing information unit 595 may utilize an on-chip monitor to detect timing differences in the row address signal ADD outputs of the left and right row address decoders 110L, 110R, timing differences in the receipt of row address signals ADD by the left and right buffers 440L, 440R, and timing differences of other operations affecting controlling the signal outputs of the buffers 440. The timing information unit 595 may also utilize a memory (e.g., a look-up table) to associate preset start times, durations, and end times of the protection periods P1, P2 with particular on-chip temperatures, signal line voltages, and other variables affecting the signal outputs of the buffers 440.

In the dual row driver architecture 400 of FIG. 4A, the protection periods P1, P2 are selectively imposed upon a set of signal line buffers (e.g., imposed upon the reset signal line buffer 440(RST) during a global reset operation). However, the operations of pixel cells 150 are typically performed on a row-by-row basis. Therefore, even if limited to subsets of buffers 440 (e.g., the reset signal line buffers 440(RST)), globally imposed protection periods may unnecessarily strain device resources and power supplies. Further, globally imposed protection periods may require frequent and precise pulsing of the control signal CON_G, e.g., for each time a pixel row is addressed by the row address decoders 110.

Figure 5A:
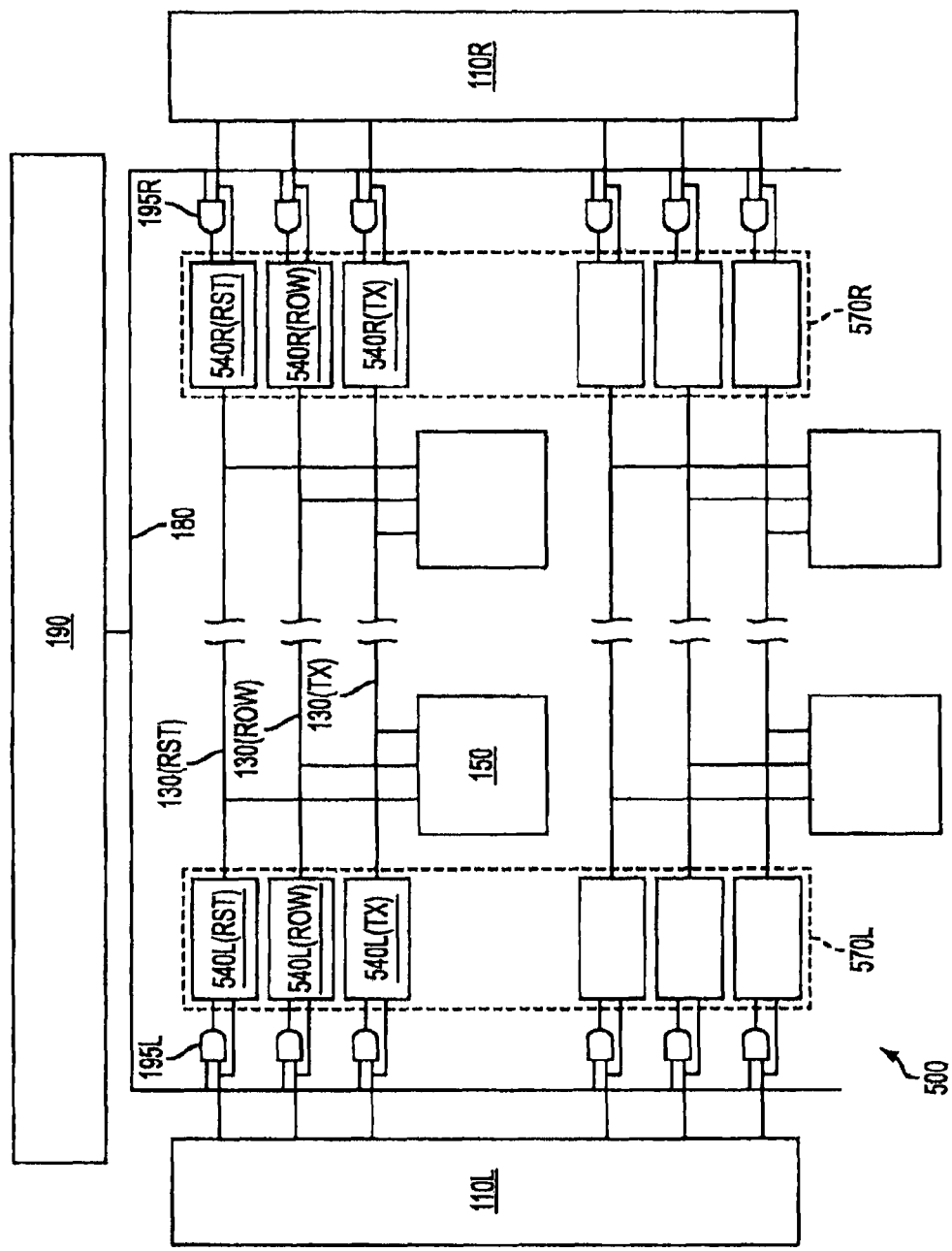
FIG. 5A is a block diagram illustrating another dual row driver architecture with inter shoot-through current protection.

FIG. 5A is a block diagram illustrating another dual row driver architecture 500 with inter shoot-through current protection, and which imposes protection periods P only upon the buffers presently addressed by the row address decoders 110. For convenience, only two pixel rows and two pixel cells 150 (of each row) are illustrated. Similar to the dual row driver architecture 400 of FIG. 4A, left and right row drivers 570L, 570R of the row driver architecture 500 of FIG. 5A respectively provide right and left reset signal line buffers 540L(RST), 540R(RST) for driving a shared reset signal line 130(RST), left and right row select signal buffers 540L(ROW), 540R(ROW) for driving a shared row select signal line 130(ROW), and left and right charge transfer signal buffers 540L(TX), 540R(TX) for driving a shared charge transfer signal line 130(TX) (hereinafter also collectively referred to as buffers 540(RST), 540(ROW), 540(TX), 540L, 540R, and 540).

Unlike the dual row driver architecture 400 of FIG. 4A, the dual row driver architecture 500 of FIG. 5A does not include respective control signal lines 180 for selectively controlling the reset 540(RST), row select 540(ROW), and charge transfer 540(TX) signal line buffers. Rather, dual row driver architecture 500 includes a single control signal line 180 and system of AND gates 195L, 195R (hereinafter also collectively referred to as AND gates 195) for imposing protection periods P only upon the buffers 540 presently addressed by the row address decoders 110. The two inputs of each AND gate 195 include a global control signal CON_G from the control signal line 180 and a row address signal ADD from a respective row address decoder 110. The AND gates 195, therefore, only output a high signal when receiving a high control signal CON_G and a high row address signal ADD addressing their respective buffers 540. The outputs of the AND gates 195 are used to control left and right protection transistors 143L, 143R (hereinafter also collectively referred to as protection transistors 143), such that the left and right buffers 540L, 540R are respectively isolated from the signal line 130 when they receive a high control signal CON_G and high row address signal ADD.

Figure 5B:
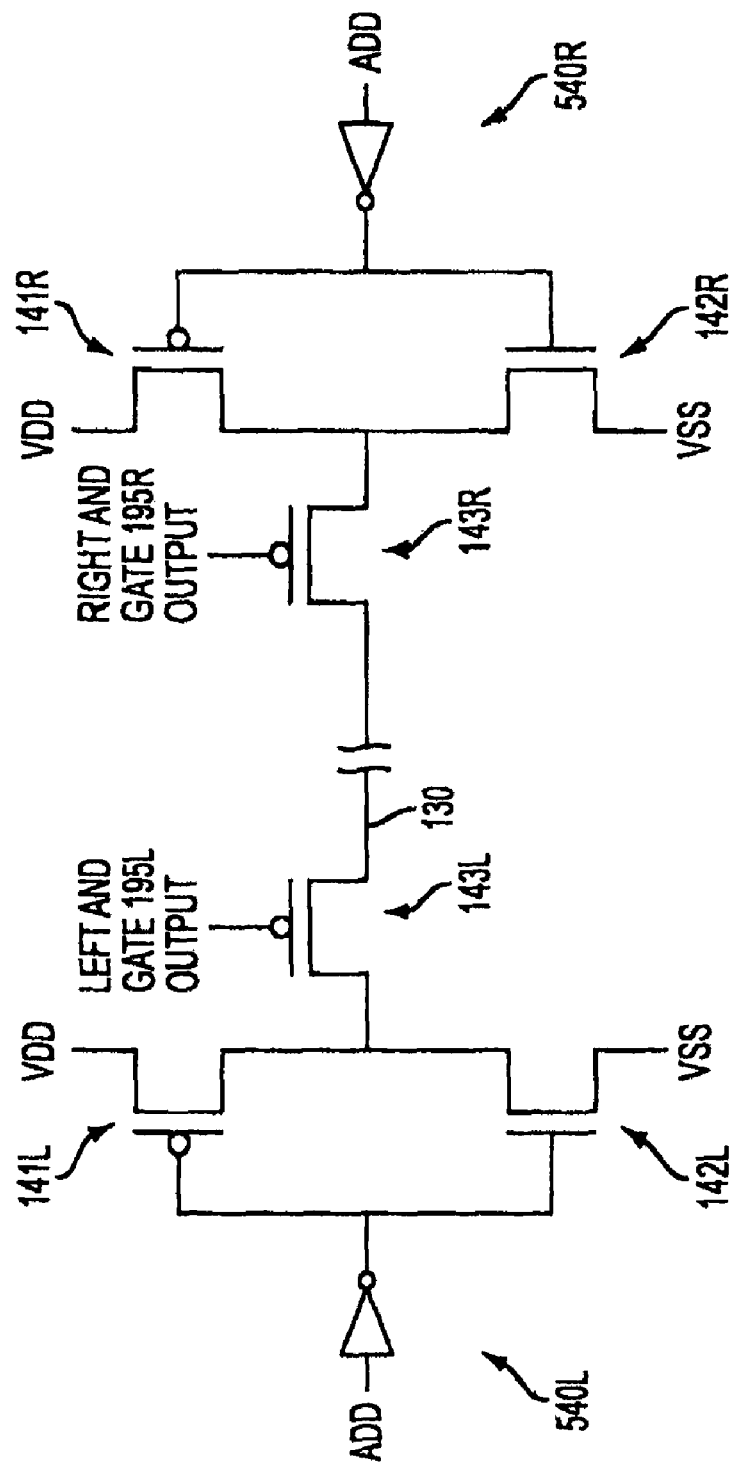
FIG. 5B is a circuit diagram for illustrating examples of inter shoot-through current protection within the dual row driver architecture of FIG. 5A.

FIG. 5B is a circuit diagram for illustrating non-limiting examples of inter shoot through current within the dual row driver architecture 500 of FIG. 5A. As shown, the circuit diagram of FIG. 5B is identical to the circuit diagram of FIG. 4B, with the exception that the left and right protection transistors 143L, 143R of FIG. 5B are controlled by the output of their respective left and right AND gates 195L, 195R. Consequently, the protection transistors 143L, 143R switch off to isolate their respective buffers 540L, 540R only when their respectively connected AND gates 195L, 195R receive both a high global control signal CON_G and a high address signal ADD.

Figure 5C:
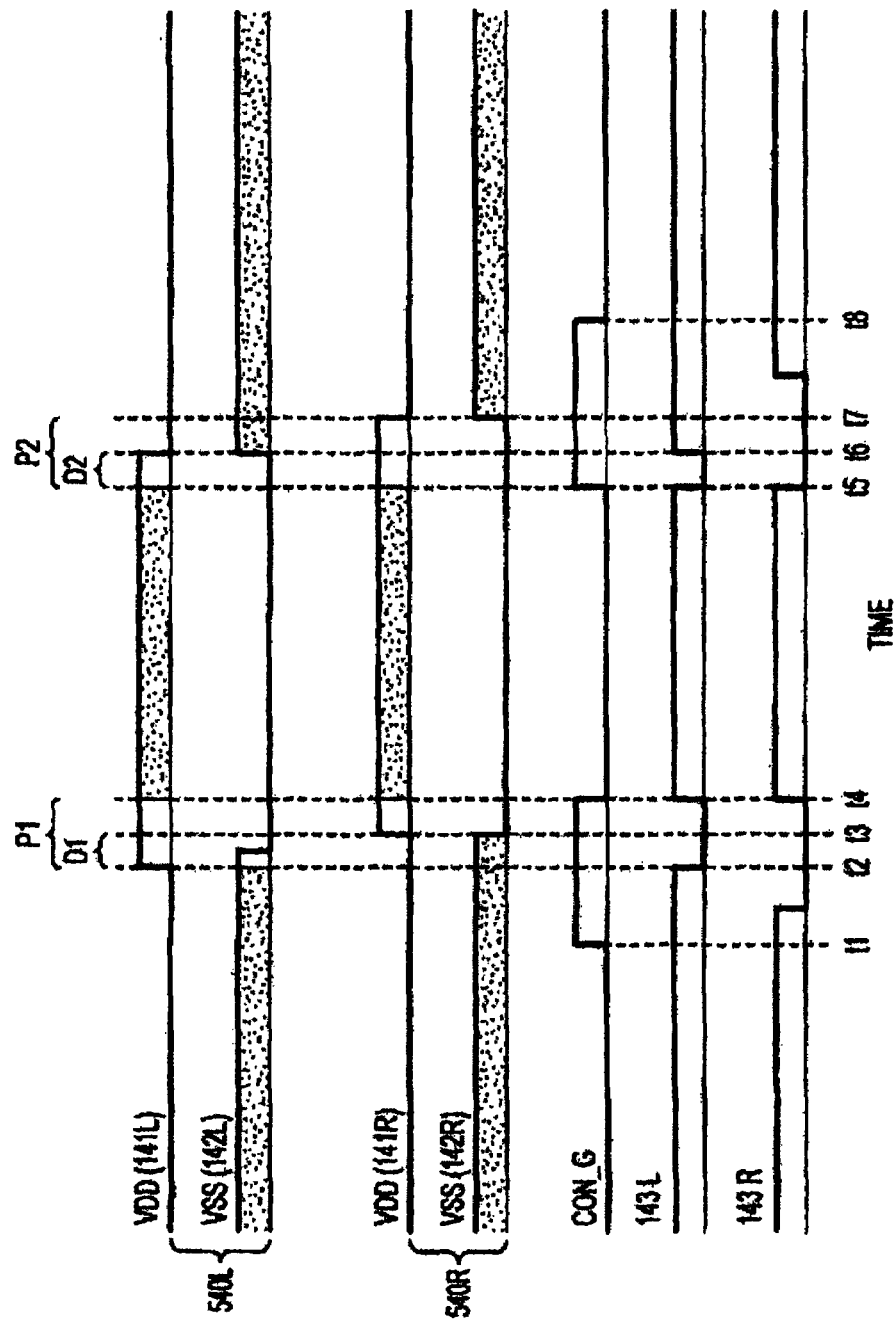
FIG. 5C is a timing diagram for illustrating examples of inter shoot-through current protection within the dual row driver architecture of FIG. 5A.

FIG. 5C is a timing diagram for illustrating non-limiting examples of inter shoot through current protection within the dual row driver architecture of FIG. 5A. In the timing diagram, the stippled gray regions represent the times at which a high VDD or low VSS signal output is transmitted by the buffers 540L, 540R to the signal line 130, and the pulse signals including those stippled regions represent the times at which the high 141 and low 142 output transistors of the buffers 540 are activated. As shown, before either of the buffers 540L, 540R receive a high address signal ADD from the row address decoders 110L, 110R (as would be respectively indicated by activation of the high output transistors 141L, 141R), a high global control signal CON_G is transmitted by the global controller 190 to all AND gates 195 at time t1. The first protection period P1 begins when a high address signal ADD is subsequently received by the left AND gate 195L at time t2 (as indicated by activation of the left high output transistor 141L, the left buffer 540L also receives the high address signal ADD at time t2), because the left protection transistor 143L is thereby switched off and blocks transmission of a high signal output VDD from the left buffer 540L to the signal line 130.

More particularly, in FIG. 5C, the first lag period D1 and protection period P1 each begin at time t2 when the high row address signal ADD is received by the left AND gate 195L, which causes the left AND gate 195L to output a high signal and thereby switch off the left protection transistor 143L. At time t2, the high row address signal is also received by the buffer left buffer 540, which consequently switches on the left high output transistor 141L. However, because the left protection transistor 143L is switched off, the left buffer 540L is isolated from the signal line 130 and, therefore, shoot-through current cannot transmit between the respective high VDD and low VDD voltage sources of the left and right buffers 540L, 540R. When the right AND gate 195R subsequently receives the high row address signal ADD at time t3, the right high output transistor 141R switches on (which ends the first lag period D1) and the right protection transistor 143R also switches off to isolate the right buffer 540R from the signal line 130. At time t4, the global controller 190 transmits a low global control signal CON_G to the AND gates 195L, 195R, which switches on each of the respective protection transistors 143L, 143R to end the first protection period P1 and allow the buffers 540L, 540R access to the signal line 130.

While the high row address signals ADD are still being received by the AND gates 195L, 195R, the global controller 190 again transmits a high global control signal CON_G Consequently, upon receiving the high global control signal at time t5, the left and right AND gates 195L, 195R each output a high signal and thereby switch off their respective protection transistors 143L, 143R begin the second protection period P2. At time t6, the left AND gate 195L receives the low row address signal ADD and switches on the left protection transistor 143L. The left buffer 540L also receives the low row address signal at time t6, and therefore respectively switches off and on the left high 141L and low 142L output transistors at that time (which starts the second lag period D2). However, because the right protection transistor 143R is still switched off, shoot-through current does not transmit between the respective low VSS and high VDD voltage sources of the left and right buffers 540L, 540R. Both the second lag D2 and second protection P2 periods end at time t7, when the low row address signal ADD is received by the right buffer 540R and right AND gate 195R to respectively switch off the right high output transistor 143R and switch on the right protection transistor 143R. At time t8, the global controller 190 transmits a low control signal CON_G.

Figure 2:
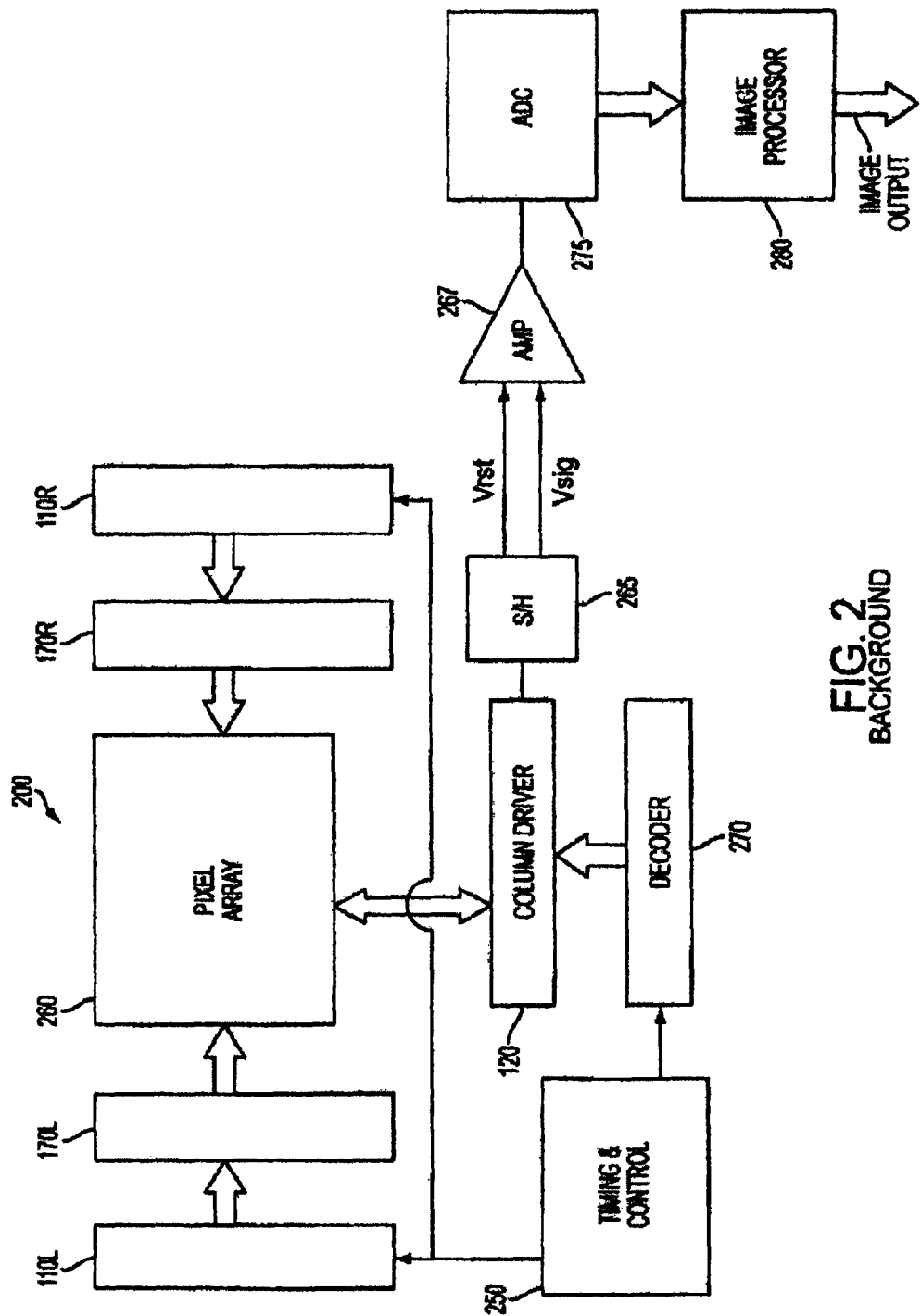
FIG. 2 is a block diagram illustrating a conventional imaging device.

In each of the dual row driver architectures 400, 500 of FIGS. 4B and 5B, the global controller 190 not only controls the prevention of inter shoot-through current, but also controls and synchronizes the transmission of high signal outputs VDD from the buffers 540L, 540R to the signal line 130; and, more particularly, controls and synchronizes the duration of the high signal outputs VDD to correspond with the end and start times of the first and second protection periods P1, P2. Because the global control signal CON_G can directly control such transmission (e.g., as in the dual row driver architecture 400 of FIG. 4A) and near directly control such transmission (e.g., as, via the AND gates 195, in dual architecture 500 of FIG. 5A). Accordingly, the global controller 190 may provide more precise timing and synching of the high signal output VDD transmissions, to the signal line 130, than provided by the row driver controls of conventional devices (which may be controlled by a chain of operations described with reference to FIG. 2).

Figure 6A:
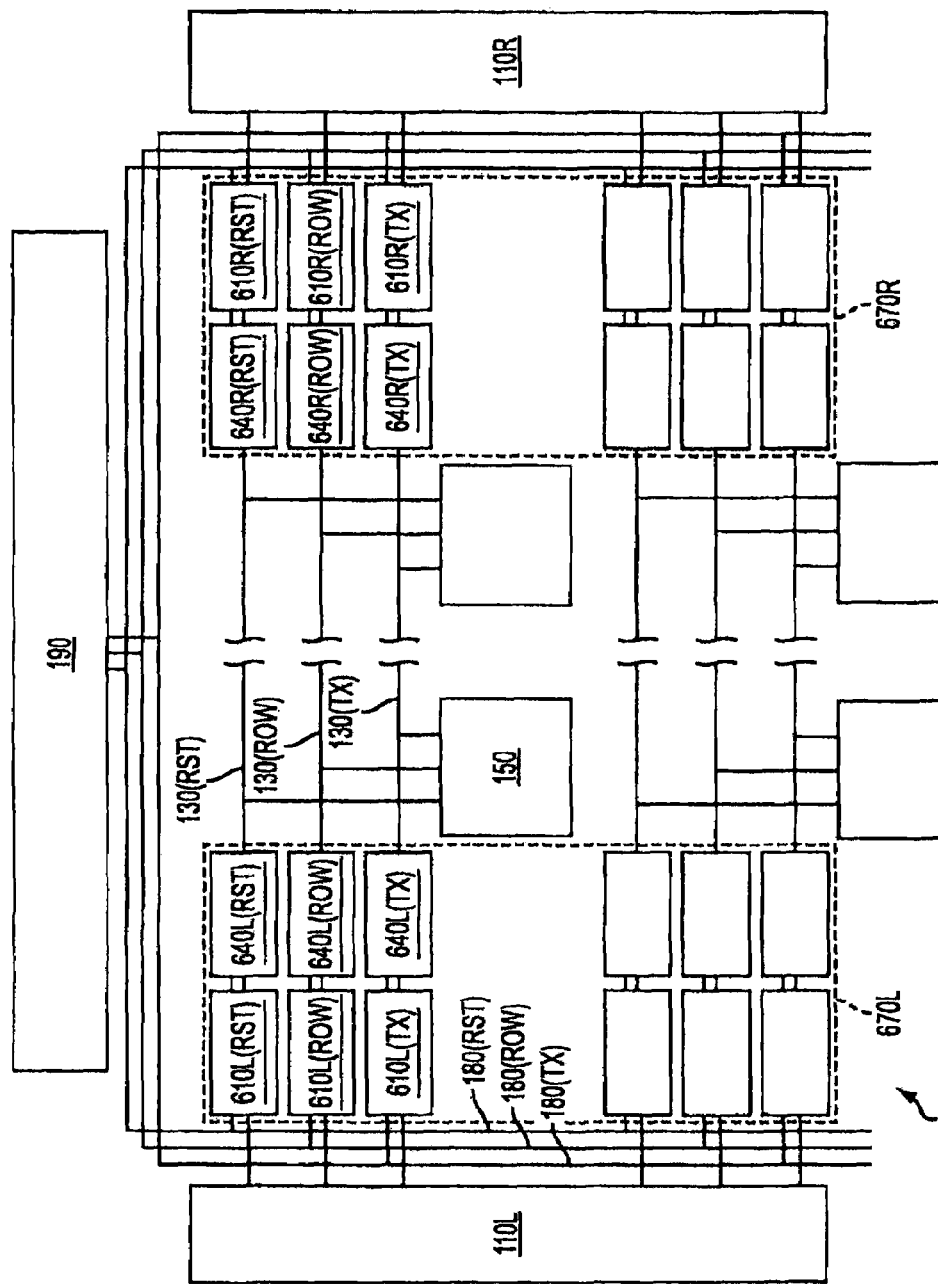
FIG. 6A is a block diagram illustrating a dual row driver architecture with inter and intra shoot-through current protection.

FIG. 6A is a block diagram illustrating a non-limiting example of a dual row driver architecture 600 with both inter and intra shoot-through current protection. For convenience, only two pixel rows and two pixel cells 150 (of each row) are illustrated. Similar to the dual row driver architectures 400, 500 of FIGS. 4A and 5A, left and right row drivers 670L, 670R of the dual row driver architecture 600 respectively provide left and right reset signal line buffers 640L(RST), 640R(RST) for driving a shared reset signal line 130(RST), left and right row select signal buffers 640L(ROW), 640R(ROW) for driving a shared row select signal line 130(ROW), and left and right charge transfer signal buffers 640L(TX), 640R(TX) for driving a shared charge transfer signal line 130(TX) (hereinafter also collectively referred to as buffers 640(RST), 640(ROW), 640(TX), 640L, 640R, and 640).

Unlike the dual row driver architectures 400, 500 of FIGS. 4B and 5B, the left and right row drivers 670L, 670R of the dual row driver architecture 600 also respectively provide left and right finite state machines (FSMs) for respectively controlling the left and right buffers 640L, 640R. More particularly, the left and right row drivers 670L, 670R respectively provide left and right FSMs 610L(RST), 610R(RST) for controlling the left and right reset signal line buffers 640L(RST), 640R(RST); left and right FSMs 610L(ROW), 610R(ROW) for controlling the left and right row select signal buffers 640L(ROW), 640R(ROW); and left and right FSMs 610L(TX), 610R(TRX) for controlling the left and right charge transfer signal buffers 640L(TX), 640R(TX). As will be later described, the FSMs 610 control the buffers 640 based on global control signals CON_G from the global controller 190 and row address signals ROW from the row address decoders 110.

Figure 6B:
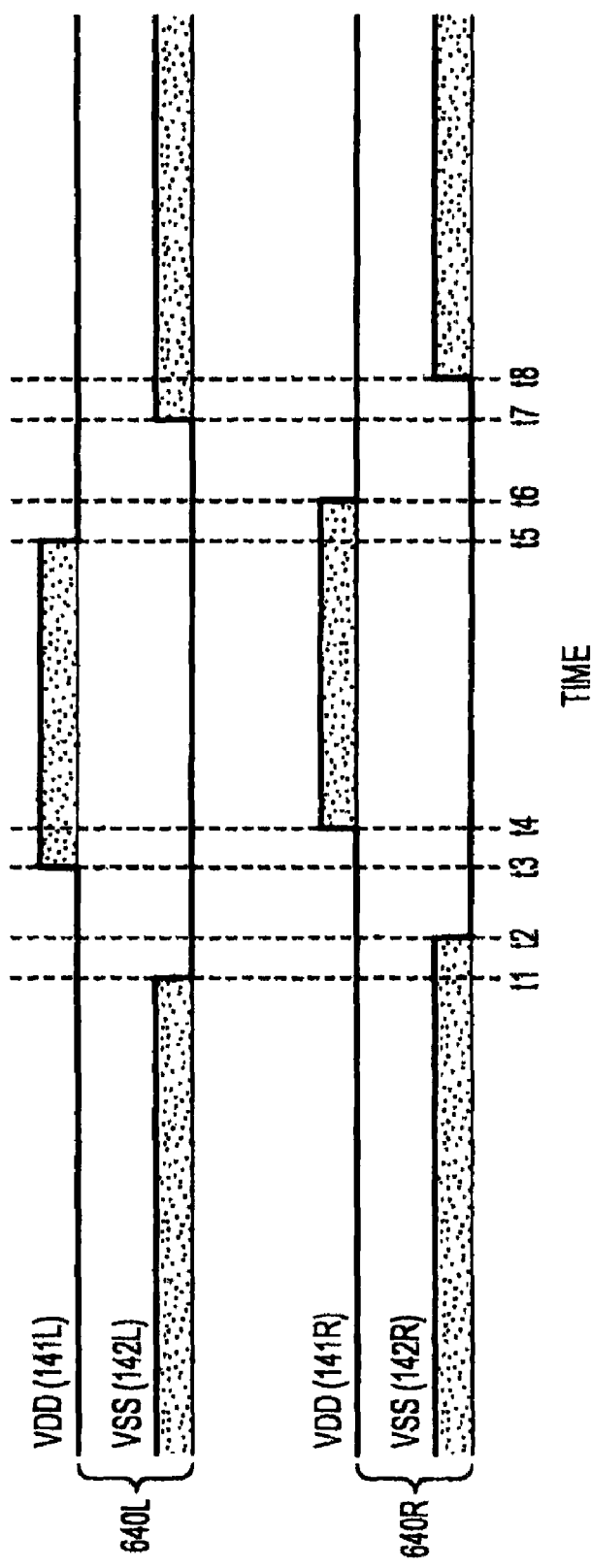
FIG. 6B is a timing diagram for illustrating examples of inter and intra shoot-through current protection within the dual row driver architecture of FIG. 6A.
Figure 6C:
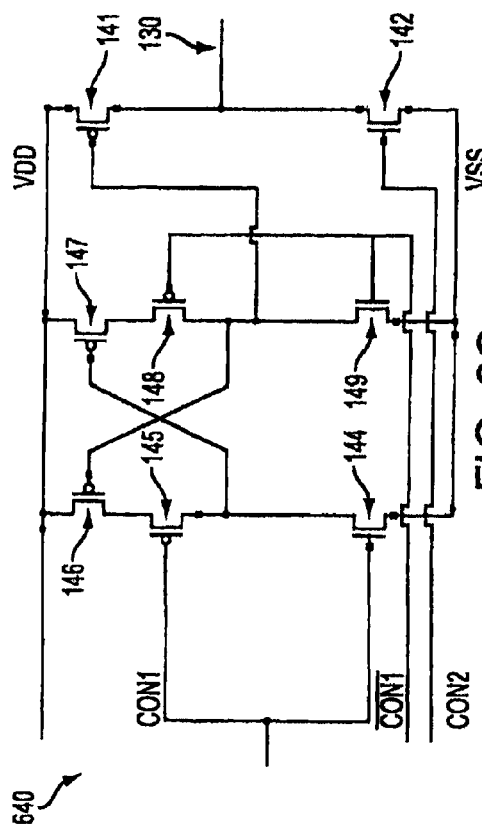
FIG. 6C is a circuit diagram illustrating a row driver buffer of the dual row driver architecture of FIG. 6A.

The buffers 640, illustrated in greater detail in FIG. 6C, cycle through three states—a low state LO for driving a signal line to a low voltage VSS, a high state HI for driving the signal line to a high voltage VDD, and a floating state Z that transitions the buffers 640 from the low LO to high HI state, or vice-versa. The state of a buffer 640 is controlled by its respective FSM 610, illustrated in greater detail in FIG. 6D, which is in turn controlled by the global control signals CON_G and row address signals ADD. The global controller 190 respectively outputs global control signals CON_G to the reset 640(RST), row select 640(ROW), and charge transfer 640(TX) signal line buffers via respective reset 180 (RST), row select 180(ROW), and charge transfer 180(TX) global control signal lines.

FIG. 6B is a timing diagram for illustrating non-limiting examples of inter and intra shoot-through current protection within the dual architecture 600 of FIG. 6A. As shown, the left and right buffers 640L, 640R each follow the same timeline of high HI, low LO, and floating Z states, but the start and end times of those states HI, LO, Z are staggered due to various possible causes (e.g., staggered receipt of the row address signals ADD by the FSMs 610). In the low state LO, a low signal output VSS is transmitted by an isolation device, shown as a low output transistor 142 of a buffer 640 (FIG. 6C), to the signal line 130. The low states LO of the left buffer 640L span before t1 and after t7, and the low states LO of the right buffer 640R span before t2 and after t8. In the high state HI, a high signal output VDD is transmitted by the an isolation device, shown as a high output transistor 141 of the buffer 640 (FIG. 6C), to the signal line 130. The high states HI of the left buffer 640L span between times t3 and t5, and the high states HI of the right buffer 640R span between times t4 and t6. In the floating state Z, neither a low VSS nor high VDD signal output is transmitted by the buffers 640L, 640R. The floating states Z of the left buffer 640L span between times t1 and t3 and between times t5 and t7, and the floating states of the right buffer 640R span between times t2 and t4 and between times t6 and t8.

As can be seen, the floating states Z prevent inter shoot-through current by preventing the left and right buffers 640L, 640R from transmitting different signal outputs, e.g., the high VDD and low VSS signal outputs of FIG. 6B, at the same time. In addition, the floating states Z prevent intra shoot-through current by preventing the high 141 and low 142 output transistors of the same buffer 640 from being switched on at the same time. As disclosed below with reference to FIGS. 6C and 6D, the inter and intra shoot through current protection of the dual row driver architecture of FIG. 6A is achieved without the use of protection transistors 143 to isolate the buffers 640 from the signal line 130.

Figure 6D:
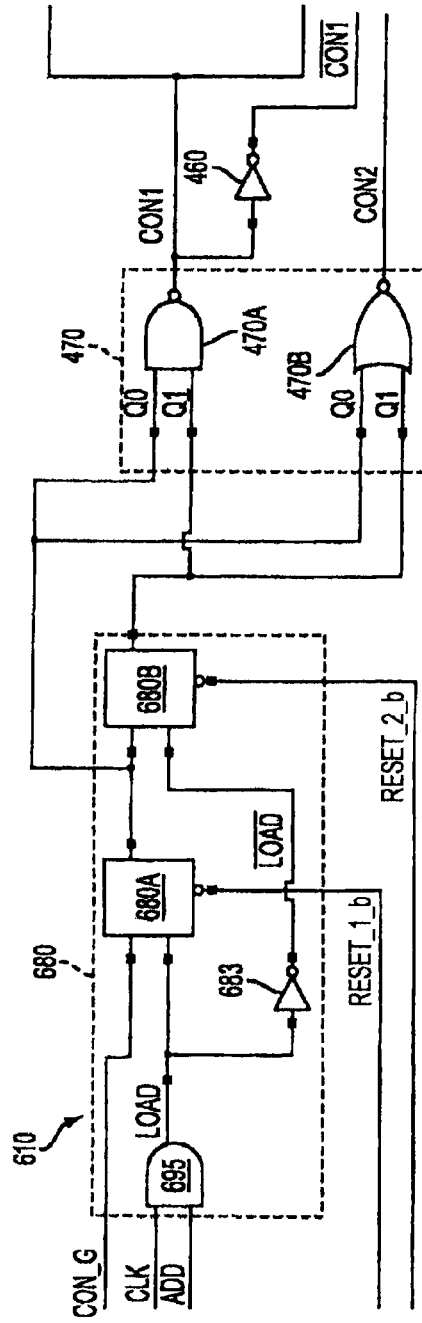
FIG. 6D is a circuit diagram illustrating a finite state machine of the dual row driver architecture of FIG. 6A.

FIGS. 6C and 6D are circuit diagrams respectively illustrating non-limiting examples of a buffer 640 and FSM 610, which may be employed by the dual row driver architecture 600 of FIG. 6A. As noted, the buffer 640 of FIG. 6C is a three-state buffer having high HI, low LO, and floating states Z controlled by the FSM 610. The FSM 610 of FIG. 6D is a four-state finite state machine controlled by five inputs: global control CON_G, clock CLK, row address ADD, first reset RESET_1_*b*, and second reset RESET_2_*b* signals. The buffer 640 and FSM 610 are described below with reference to the control of the FSM 610 by the five inputs, and the resulting control of the buffer 640 by the FSM 610.

The clock CLK and row address ADD signals are input to an AND gate 695, which outputs a corresponding load signal LOAD. The global control CON_G, load LOAD, and reset RESET_1_*b*, RESET_2_*b* signals are input to a latch system 680 including two latches 680A, 680B. The global control CON_G, load LOAD, and first reset RESET_1_*b* signals are input to the first latch 680A. The output Q0 of the first latch 680A, the inverted load signal LOAD output by an inverter 683, and the second reset signal RESET_2_*b* are input to the second latch 680B. The respective outputs Q0, Q1 of the first and second latches 680A, 680B determine the state of the FSM 610, which is one of four states (Q0, Q1)=00, 01, 10, and 11. The inner workings of the latches 680A, 680B is well known in the art.

A decoder circuit 470 converts the latch system 680 outputs Q0, Q1 to produces a first local control signal CON1, its complement signal CON1', and a second local control signal CON2 for collectively controlling the state of the buffer 640. The decoder circuit 470 includes a NAND 470A gate for generating the first local control signal CON1 based on the latch system 680 outputs Q0, Q1; and a NOR gate 470B for generating the second local control signal CON2 based on the latch system 680 outputs Q0, Q1. The first local control signal CON1 is inverted by an inverter 460. The first CON1, inverted first CON1', and second CON2 local control signals are input to the buffer 640 to select one of the high HI, low LO, and floating Z states. Now referring back to FIG. 6C, the buffer 640 includes high 141 and low 142 output transistors having first terminals respectively connected to high VDD and low VSS voltage sources, and second terminals commonly connected to a signal line 130. During the floating state Z, both the high 141 and low 142 output transistors are switched off such that the high VDD and low VSS voltage sources cannot short to the signal line 130.

Each of the four states of the FSM 610 corresponds to one of the three states HI, LO, Z of the buffer 640. Table 1 shows a relationship between the states of the FSM 610 (Q0, Q1), the inverted first control signal CON1', the second control signal CON2, the states of the transistors 141-148 within the buffer 640, and the states HI, LO, Z of the buffer 640. As shown, the high 141 and low 142 output transistors are respectively switched off and on during the low state LO, switched on and off during the high state HI, and switched off during the floating states Z. As also shown, there is no instance in which the inner transistors 143-148 are switched on in a manner that shorts the high VDD and low VSS voltage sources of the buffer 640.

TABLE 1

| (Q0, Q1) | CON1 | CON1' | CON2 | Transistors ON | Transistors OFF | Buffer State |
|---|---|---|---|---|---|---|
| 00 | 1 | 0 | 1 | 142, 144, 147, and 148 | 141, 145, 146, and 149 | LO |
| 01 | 1 | 0 | 0 | 144, 147, and 148 | 141, 142, 145, and 149 | Z |
| 10 | 1 | 0 | 0 | 144, 147, and 148 | 141, 142, 145, and 149 | Z |
| 11 | 0 | 1 | 0 | 141, 145, 146, and 149 | 142, 144, 147, and 148 | HI |

Figure 6E:
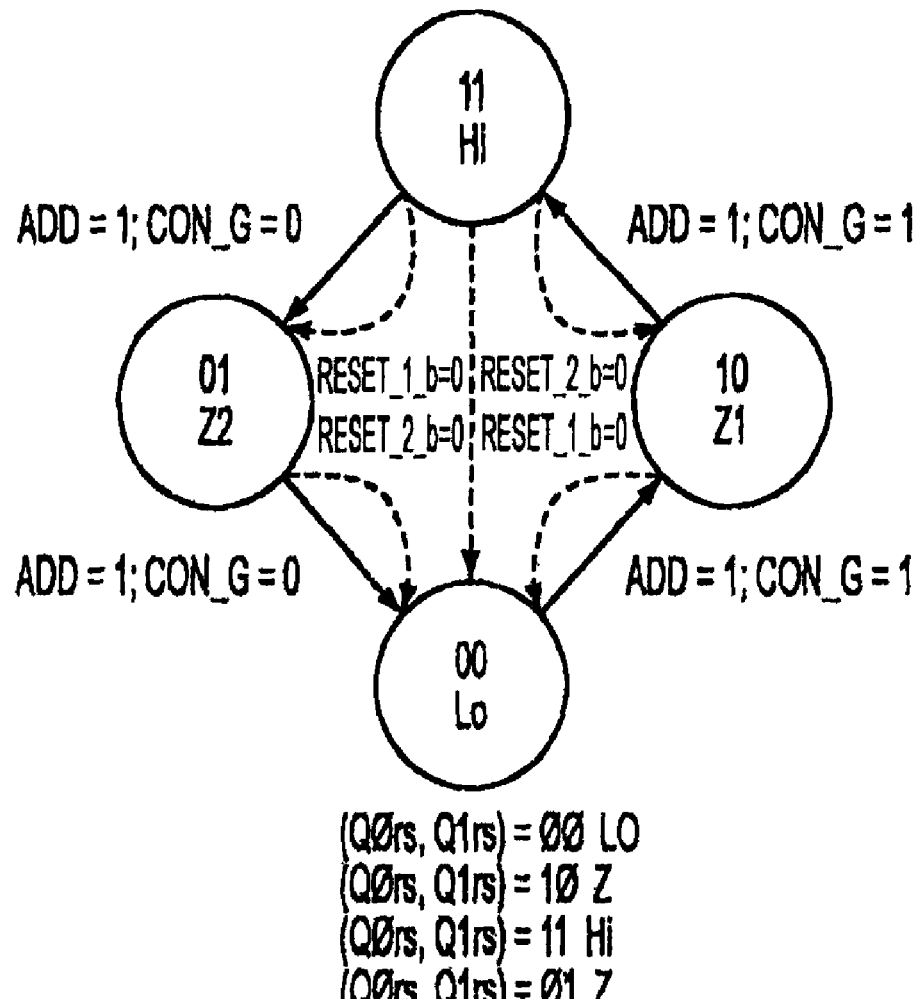
FIG. 6E is a finite state machine model illustrating an operation of the finite state machine and row driver buffer of FIGS. 6C and 6D.

FIG. 6E is an FSM model illustrating a non-limiting example of an operation of the coupled buffer 640 and FSM 610 of FIGS. 6C and 6D. The four output states (Q0, Q1) of the FSM 610 and the corresponding high HI, low LO, and floating states Z of the buffer 640 are indicated within the circles. The inputs of the FSM 610, which prompt transition of the FSM 610 and buffer 640 from one state to the next, are indicated by straight arrows for the global control CON_G and row select ADD signals, and indicated by curved arrows for the reset signals RESET_1_*b*, RESET_2_*b*. As shown, the FSM model does not allow a direct transition between the high HI and LO states of the buffer 640. Because the floating state Z is imposed on a buffer 640 when switching from a high VDD to low VSS output, or vice versa, the floating state Z prevents an occurrence of high VDD and low VSS voltage sources shorting within the same buffer 640.

In this example, even when merely resetting the buffer 640 to ensure it is in the low state LO, direct transition between the high HI and low LO state is prevented. To reset the buffer 640, both of the reset signals RESET_1_*b*, RESET_2_*b* are switched low to force the output state of the FSM 610 to (Q0, Q1)=(0,0), and to thereby force the buffer 640 to the low state LO. So long as the reset signals RESET_1_*b*, RESET_2_*b* are not switched from high to low at the same moment, there will be some duration for which the reset signals RESET_1_*b*, RESET_2_*b* are different. If the reset signals RESET_1_*b*, RESET_2_*b* are temporarily set at (1, 0), i.e., the second reset signal RESET_2_*b* is driven low before the first reset signal RESET_1_*b* (see right half of the FSM model), then the FSM 610 output state is temporarily set at (Q0, Q1)=(1, 0) to place the buffer 640 in the first floating state Z1. Similarly, if the reset signals RESET_1_*b*, RESET_2_*b* are temporarily set at (0, 1), i.e., the first reset signal RESET_1_*b* is driven low before the second reset signal RESET_2_*b* (see left half of the FSM model), then the FSM 610 output state is temporarily set at (Q0, Q1)=(0, 1) to place the buffer 640 in the second floating state Z2. Thus, even when transitioning from the high state HI to the low state LO by way of the reset operation, the buffer 640 passes through either the first Z1 or second Z2 floating state.

Figure 6F:
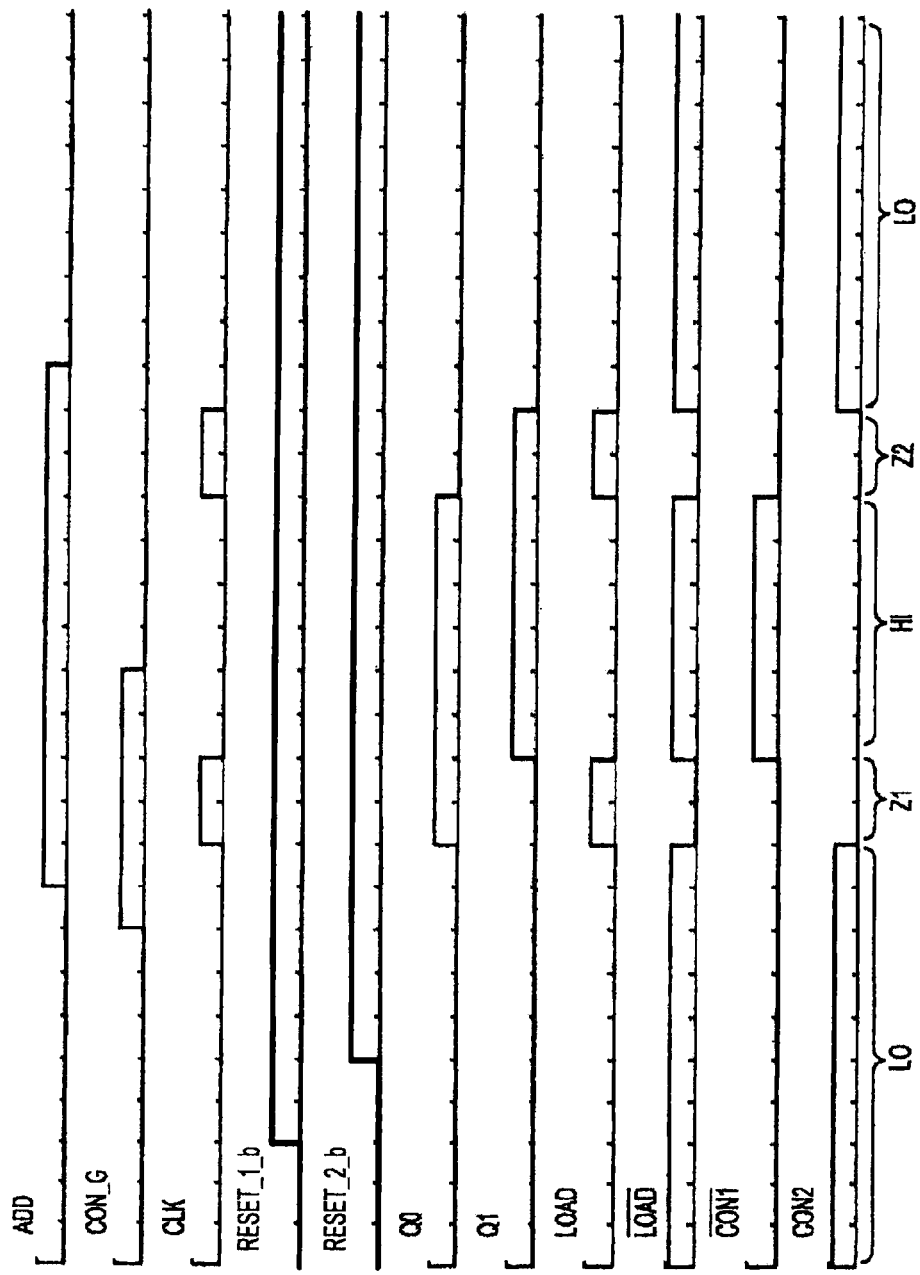
FIG. 6F is a timing diagram illustrating an operation the finite state machine and row driver buffer of FIGS. 6C and 6D.

FIG. 6F is a timing diagram illustrating a non-limiting example of an operation of the coupled buffer 640 and FSM 610 of FIGS. 6C and 6D. As shown, their operation is initialized when the first RESET_1_b and second RESET_2_b reset signals are set low to ensure that the FSM 610 output state is set at (Q0, Q1)=(0, 0), which also ensures that the buffer 640 is in the low state LO. Next, the global control CON_G and row address ADD signals are driven high such that, when the clock signal CLK subsequently pulses, the load signal LOAD input to the first latch 680A will correspondingly rise and fall with the clock signal CLK; and the inverted load signal LOAD' input to the second latch 680B will conversely fall and rise with the clock signal CLK. The output Q0 of the first latch 680A switches to the same logic state as the global control signal CON_G when the clock signal CLK rises, while the output Q1 of the second latch 680B switches to the same logic state as the global control signal CON_G when the clock signal CLK falls. Consequently, pulsing the clock signal CLK switches the logic state of the first latch 680A output Q0 and then the second latch 680B output Q1 to equal the logic state of the global control signal CON_G. Because the global control signal CON_G is set to "1" during the first clock signal CLK pulse and set to "0" during the second clock signal CLK pulse, the logic states of the FSM 610 (Q0, Q1) sequentially equal 00, 10, 11, 01, and then 00. With reference to Table 1, sequencing through those latch system 680 outputs (Q0, Q1)=00, 10, 11, 01, then 00 causes the first control signal CON1 (shown as the inverted first control signal CON1') and second CON2 control signal to cycle the buffer 640 through the low LO, floating Z1, high HI, floating Z2, and then low LO states. The floating states Z1, Z2 have the same duration as the respective clock signal CLK pulses that induce them.

Figure 7:
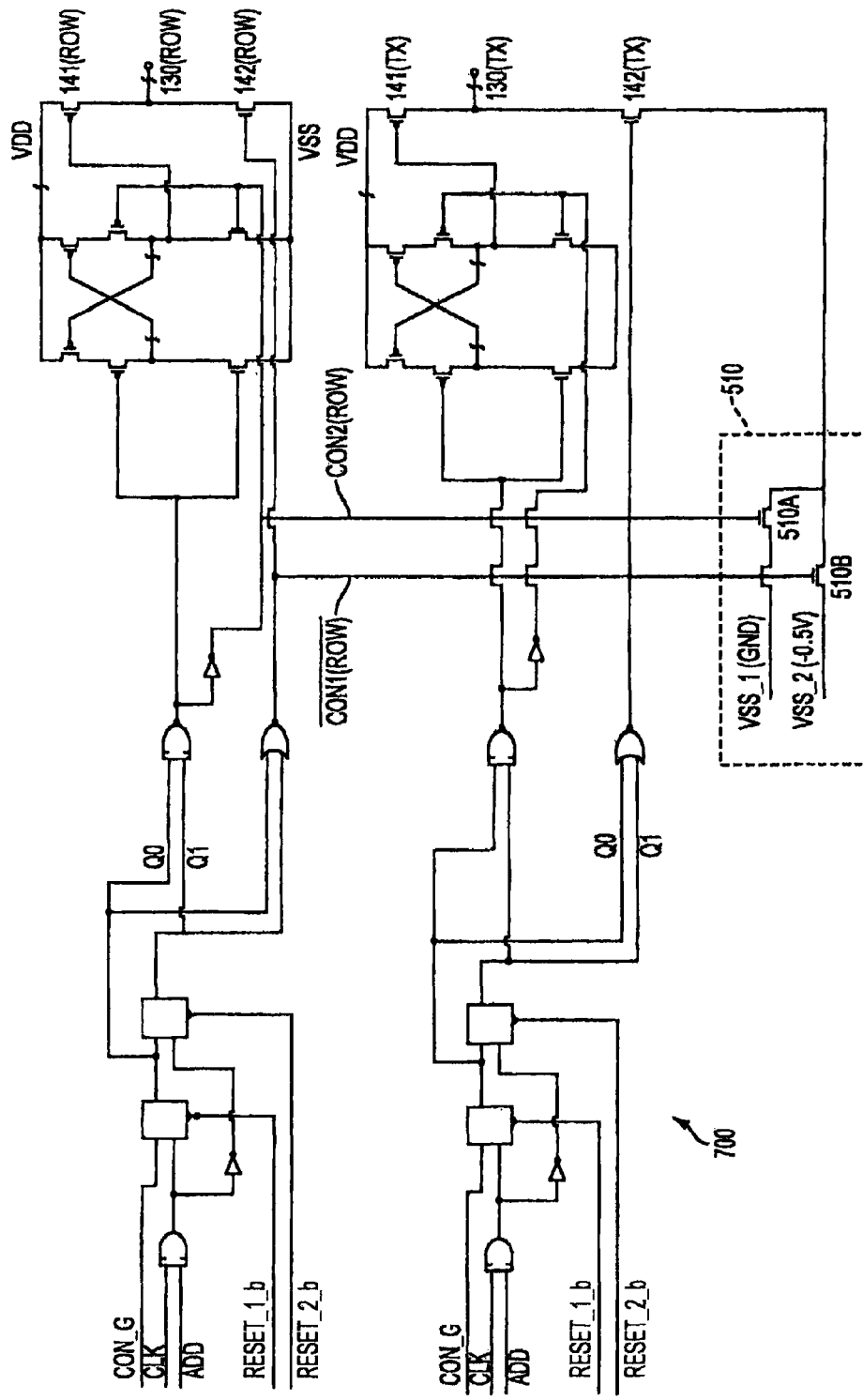
FIG. 7 is a circuit diagram illustrating a finite state machine system for controlling multiple row driver buffers.

FIG. 7 is a circuit diagram illustrating a non-limiting example of an FSM system 700 for controlling row select 640(ROW) and charge transfer 640(TX) buffers during a pixel readout operation driving the charge transfer 106 and row select 109 transistors of an addressed pixel row. A charge transfer FSM 610(TX) controls the coupled charge transfer 640(TX) buffer to transmit a charge transfer signal TX over the charge transfer signal line 130(TX). A row select FSM 610(ROW) controls the row select buffer 640(ROW) to transmit the row select signal ROW over a row select signal line 130(ROW). With two exceptions, the configurations and operations of the FSMs 610(ROW), 610(TX) and their respectively coupled buffers 640(ROW), 640(TX) are similar to the configuration and operation of the FSM 610 and coupled buffer 640 of FIGS. 6A-F. Two exceptions are noted below.

The first exception is that the timing of the signals CON_G, CLK, ADD, RESET_1_b, RESET_2_b input to the FSM 610 may be different for the charge transfer FSM 610(ROW) and row select 640(TX) buffers to account for their different respective functions of transferring charge from a photosensor 101 to a floating diffusion region 102 and then gating the resulting image signal V(SIG) from the source follower transistor 108 to the column output line 160. Like the FSM 610 of FIGS. 6A-E, the row select 610(ROW) and charge transfer 610(TX) FSMs can be individually controlled by varying the clock signal CLK, global control signal CON_G, or both. Such independent operation allows the tiring of the high VDD and low VSS outputs of the buffers 640(ROW), 640(TX) to be accurately controlled by the local clock signal CLK, which better ensures that two opposing buffers 640L, 640R each start and stop driving their shared signal line 130 at the same time.

Referring again to FIG. 7, second exception is that the inverted first CON1'(ROW) and second CON2(ROW) control signals generated by the row select FSM 610(ROW) are input to both the charge transfer 640(TX) and row select 640(ROW) buffers. The inverted first CON1'(ROW) and second CON2 (ROW) row select control signals control the row select buffer 640(ROW) in the manner described with reference to the FSM 610 and buffer 640 of FIGS. 6A-F. The inverted first CON1(ROW)' and second CON2(ROW) row select control signals also control an output selection circuit 510 of the charge transfer buffer 640(TX) to select one of first VSS_1 and second VSS_2 low voltages for output to the charge transfer signal line 130(TX). The output selection circuit 510 includes a first output transistor 510A for gating the first low voltage VSS_1 to the lower transistor 142(TX) of the charge transfer buffer 640(TX) in response to the second control signal CON2(ROW); and includes a second output transistor 510B for gating the second low voltage VSS_2 to the lower transistor 142(TX) of the charge transfer buffer 640(TX) in response to the inverted first control signal CON1(ROW)'. If the first low voltage VSS_1 is set to ground and the second low voltage VSS_2 is set to a negative value such as 0.5V, when the row select buffer 640(ROW) is driving the row select transistors 109 (i.e., when the second control signal CON2(ROW) is high), the charge transfer signal line 130 (TX) is driven to ground. When the row select buffer 640 (ROW) is not driving the row select transistors 109 to read out the image signals V(SIG) of the pixels 150 (i.e., when the inverted first control signal CON1(ROW)' is high), the charge transfer signal line 130(TX) is driven to −0.5V to increase the resistance of the charge transfer transistors 106 and thereby deter unwanted backspilling of charges from the floating diffusion region 102 to the photodetector 101 during pixel readout.

Figure 8:
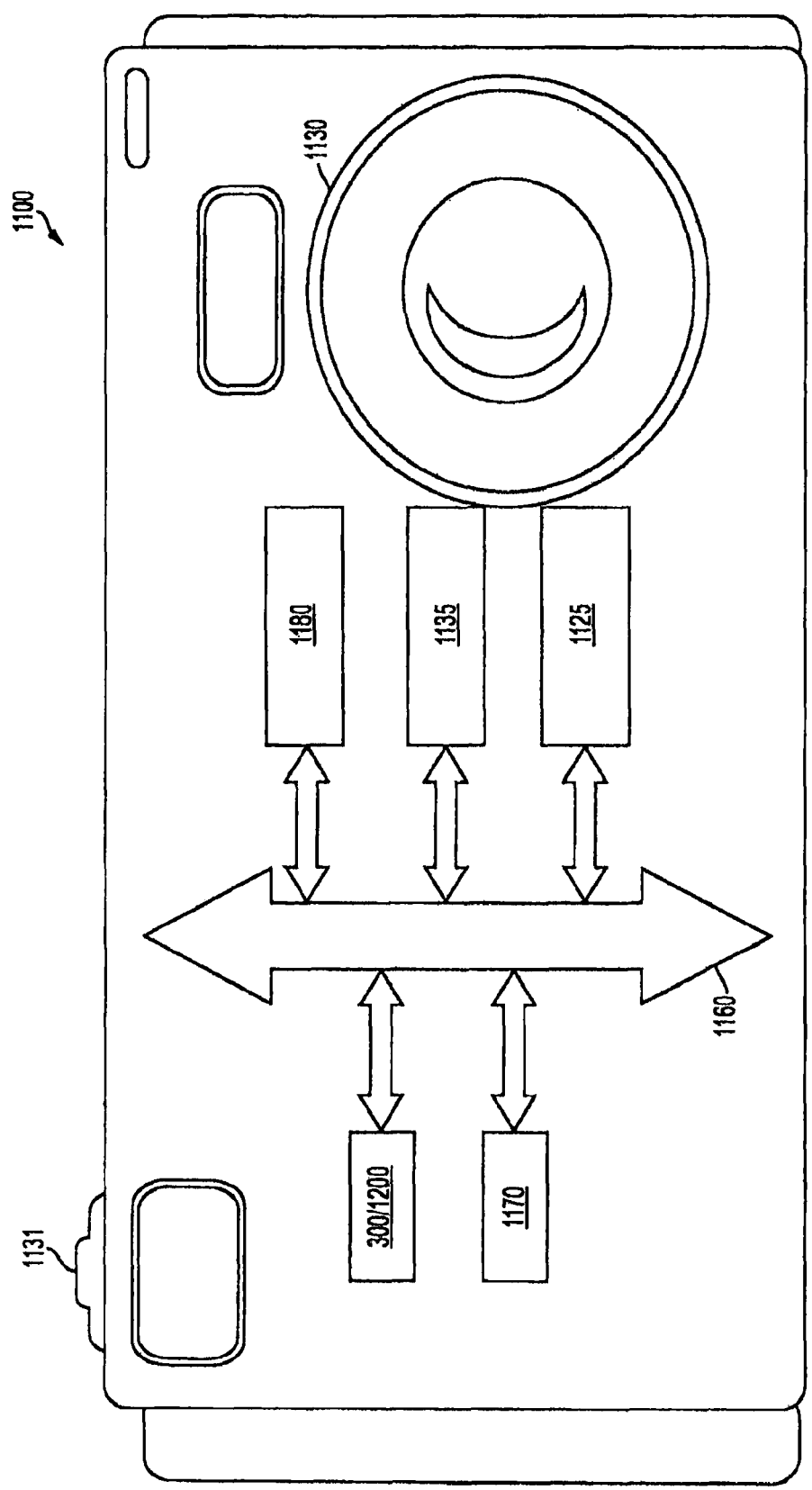
FIG. 8 is a block diagram illustrating an image processing system.

FIG. 8 is a block diagram illustrating a non-limiting example of a processor system 1100 which may employ aspects of the embodiments described above. The system 1100 includes the imaging device 200 of FIG. 2 configured in accordance with the embodiments disclosed herein, to drive one or more control lines of the charge transfer 106, reset 107, and row select 109 transistors. The system also includes input/output (I/O) devices 1170, a CPU 1180 for controlling the processor system 1100, random access memory (RAM) 1125, removable memory 1135, and a bus 1160 for communication between the connected components. In this instance, the processor system 1100 may be configured as a still or video camera system including at least one lens 1130 for focusing an incoming image on the pixel array 260 of the imaging device 200 when a shutter release button 1131 is pressed.

While various embodiments have been discussed and illustrated, the invention is not limited to these embodiments as various changes can be made thereto without departing form the spirit or scope of the invention which is defined by the appended claims.

What is claimed as new and desired to be protected by Letters Patent of the United States is:

1. A method of operating an imaging device, comprising:
    during a first driving state of a first signal line, supplying a first signal from a first signal output to a plurality of pixel cells via said first signal line;
    during a second driving state of said first signal line, supplying a second signal from a second signal output to said plurality of pixel cells via said first signal line, said first signal having a different voltage than said second signal;

during a third driving state of said first signal line, transmitting neither said first nor said second signal to said first signal line;
transmitting a control signal from a controller, said control signal causing an isolation device to block said supplying of said second signal from said second signal output to said plurality of pixel cells for a time period starting before and ending after a time t when said supplying of said first signal from said first signal output to said first signal line is started; and
interposing said third driving state between said first and second driving states based on said control signal.

2. The method of claim 1, wherein said first signal has a greater voltage than said second signal.

3. The method of claim 1, further comprising:
supplying a clock signal to said controller; and
starting said time period at least one clock cycle of said clock signal before said time t.

4. The method of claim 1, further comprising:
supplying said first signal from a third signal output to said first signal line; and
supplying said second signal from a fourth signal output to said first signal line, wherein said first isolation device is arranged in series between said second and third signal outputs.

5. The method of claim 4, further comprising:
transmitting said control signal or another control signal from said controller, said control signal causing a second isolation device to block said supplying of said second signal from said fourth signal output to said plurality of pixel cells for said time period starting before and ending after said time t.

6. The method of claim 1, wherein said first isolation device is arranged on said first signal line.

7. The method of claim 6, wherein said first isolation device is arranged in series between a pair of said plurality of pixel cells.

8. The method of claim 1, wherein said first isolation device is arranged in series between said first signal output and said first signal line.

9. The method of claim 1, wherein said first isolation device is arranged in series between said second signal output and a common node connecting said first and second signal outputs.

10. The method of claim 1, wherein said first isolation device is arranged in series between said plurality of pixel cells and a common node connecting said first and second signal outputs, a second isolation device is arranged in series between said plurality of pixel cells and a common node connecting a third and fourth signal outputs.

11. The method of claim 10, wherein said controller switches on said first and second transistors at the same time and switches off said first and second transistors at the same time.

12. The method of claim 1, wherein said first signal line is connected to a respective one of charge transfer, reset, or row select transistors for reading out pixel cell signals of said plurality of pixel cells.

13. The method of claim 12, wherein said control signal is transmitted when switching on or off said respective one of said charge transfer, reset, or row select transistors.

* * * * *